(12) United States Patent
Bhojwani et al.

(10) Patent No.: US 9,836,773 B2
(45) Date of Patent: *Dec. 5, 2017

(54) EVALUATION AND SELECTION OF QUOTES OF A COMMERCE NETWORK

(71) Applicant: Ariba, Inc., Sunnyvale, CA (US)

(72) Inventors: Sudhir Bhojwani, Mountain View, CA (US); Kshitij Dayal, San Jose, CA (US); Sanish Mondkar, San Francisco, CA (US)

(73) Assignee: Ariba, Inc., Sunnyvale, CA (US)

( * ) Notice: Subject to any disclaimer, the term of this patent is extended or adjusted under 35 U.S.C. 154(b) by 735 days.

This patent is subject to a terminal disclaimer.

(21) Appl. No.: 14/284,671

(22) Filed: May 22, 2014

(65) Prior Publication Data

US 2014/0310121 A1 Oct. 16, 2014

Related U.S. Application Data

(63) Continuation-in-part of application No. 13/632,031, filed on Sep. 30, 2012, now abandoned, which is a
(Continued)

(51) Int. Cl.
*G06Q 30/00* (2012.01)
*G06Q 30/06* (2012.01)
*G06Q 30/08* (2012.01)

(52) U.S. Cl.
CPC ......... *G06Q 30/0611* (2013.01); *G06Q 30/06* (2013.01); *G06Q 30/08* (2013.01)

(58) Field of Classification Search
CPC .... G06Q 30/00; G06Q 30/0611; G06Q 30/06; G06Q 30/08
(Continued)

(56) References Cited

U.S. PATENT DOCUMENTS 5,253,165 A 10/1993 Leiseca et al.
6,285,983 B1 9/2001 Jenkins
(Continued)

OTHER PUBLICATIONS

"To be or not to B2B: evaluating managerial choices for e-procurement channel adoption," Information Technology and Management, Apr. 2006, v7i2; ProQuest Dialog #152633304 32pgs.*
(Continued)

*Primary Examiner* — Rob Pond
(74) *Attorney, Agent, or Firm* — Brian R. Short

(57) ABSTRACT

Embodiments for methods, systems and apparatuses of a commerce network for completing a commercial transaction are disclosed. One computer-method includes receiving, by one or more commerce network servers, a buyer-initiated demand for fulfillment of the commercial transaction, identifying suppliers to satisfy the buyer-initiated demand based on buyer policies and supplier characteristics, requesting quotes from the identified suppliers, receiving quotes from the identified suppliers, evaluating and selecting, by the one or more commerce network servers, one or more of the received quotes, wherein evaluating and selecting the one or more of the received quote comprises applying evaluating criteria to the received quotes, wherein the evaluation criteria includes applying a weighted combination of a plurality of evaluating factors, and facilitating presentation of the one or more selected quotes to the buyer.

26 Claims, 11 Drawing Sheets

Related U.S. Application Data continuation-in-part of application No. 13/270,189, filed on Oct. 10, 2011, now abandoned, which is a continuation-in-part of application No. 13/176,020, filed on Jul. 5, 2011, now Pat. No. 8,688,537.

(60) Provisional application No. 61/488,744, filed on May 22, 2011.

(58) Field of Classification Search
USPC .................................................. 705/26, 27
See application file for complete search history.

(56) References Cited

U.S. PATENT DOCUMENTS

| | | | |
|---|---|---|---|
| 6,285,989 B1 | 9/2001 | Shoham | |
| 6,584,451 B1 | 6/2003 | Shoham et al. | |
| 6,606,603 B1 | 8/2003 | Joseph et al. | |
| 6,952,682 B1 | 10/2005 | Wellman | |
| 7,043,531 B1* | 5/2006 | Seibel | G06Q 30/02 705/14.23 |
| 7,072,061 B2 | 7/2006 | Blair et al. | |
| 7,117,165 B1 | 10/2006 | Adams et al. | |
| 7,130,815 B1 | 10/2006 | Gupta | |
| 7,146,331 B1 | 12/2006 | Young | |
| 7,152,043 B2 | 12/2006 | Alaia et al. | |
| 7,200,578 B2 | 4/2007 | Paltenghe et al. | |
| 7,225,145 B2 | 5/2007 | Whitley et al. | |
| 7,225,152 B2 | 5/2007 | Atkinson et al. | |
| 7,249,085 B1 | 7/2007 | Kinney, Jr. et al. | |
| 7,283,979 B2 | 10/2007 | Tulloch et al. | |
| 7,283,980 B2 | 10/2007 | Alaia et al. | |
| 7,296,001 B1 | 11/2007 | Ephrati et al. | |
| 7,346,574 B2 | 3/2008 | Smith et al. | |
| 7,383,206 B2 | 6/2008 | Rupp et al. | |
| 7,395,238 B2 | 7/2008 | Alaia et al. | |
| 7,401,035 B1 | 7/2008 | Young | |
| 7,444,299 B2 | 10/2008 | Smith et al. | |
| 7,483,852 B2 | 1/2009 | Marhafer et al. | |
| 7,499,876 B2 | 3/2009 | Rupp et al. | |
| 7,536,362 B2 | 5/2009 | Starr et al. | |
| 7,558,746 B2 | 7/2009 | Alaia et al. | |
| 7,558,752 B1 | 7/2009 | Ephrati et al. | |
| 7,571,137 B2 | 8/2009 | Alaia et al. | |
| 7,599,878 B2 | 10/2009 | Atkinson et al. | |
| 7,634,439 B1 | 12/2009 | Smith | |
| 7,657,461 B2 | 2/2010 | Young | |
| 7,693,747 B2 | 4/2010 | Bryson et al. | |
| 7,792,707 B2 | 9/2010 | Alaia et al. | |
| 7,792,713 B1 | 9/2010 | Kinney, Jr. et al. | |
| 7,813,966 B2 | 10/2010 | Alaia et al. | |
| 7,835,957 B1 | 11/2010 | Kinney, Jr. | |
| 7,840,476 B1 | 11/2010 | Zack et al. | |
| 7,870,034 B2 | 1/2011 | Rupp et al. | |
| 7,870,054 B2 | 1/2011 | Abeshouse et al. | |
| 7,870,115 B2 | 1/2011 | Blair et al. | |
| 7,921,053 B2 | 4/2011 | Kinney, Jr. et al. | |
| 7,974,908 B1 | 7/2011 | Hommrich et al. | |
| 8,086,518 B1 | 12/2011 | Maor | |
| 8,095,451 B2 | 1/2012 | Smith et al. | |
| 8,126,701 B2 | 2/2012 | Beck | |
| 8,126,799 B2 | 2/2012 | Kellam et al. | |
| 8,190,482 B1 | 5/2012 | Federighi et al. | |
| 8,374,922 B1 | 2/2013 | Antony | |
| 2001/0047276 A1 | 11/2001 | Eisenhart | |
| 2002/0069079 A1 | 6/2002 | Vega | |
| 2002/0165844 A1* | 11/2002 | Lee | G06Q 10/10 706/47 |
| 2005/0038688 A1 | 2/2005 | Collins et al. | |
| 2005/0144046 A1 | 6/2005 | Schloss | |
| 2006/0178918 A1 | 8/2006 | Mikurak | |
| 2007/0112671 A1* | 5/2007 | Rowan | G06Q 20/10 705/39 |
| 2007/0214060 A1 | 9/2007 | Whitley et al. | |
| 2007/0239596 A1 | 10/2007 | Kinney, Jr. et al. | |
| 2007/0299765 A1 | 12/2007 | Smith et al. | |
| 2008/0027879 A1 | 1/2008 | Ephrati et al. | |
| 2008/0065526 A1 | 3/2008 | Smith et al. | |
| 2008/0071672 A1 | 3/2008 | Rupp et al. | |
| 2008/0133377 A1 | 6/2008 | Alaia et al. | |
| 2008/0133397 A1 | 6/2008 | Tulloch et al. | |
| 2008/0133398 A1 | 6/2008 | Kinney et al. | |
| 2008/0133399 A1 | 6/2008 | Rupp et al. | |
| 2008/0147533 A1 | 6/2008 | Alaia et al. | |
| 2008/0147534 A1 | 6/2008 | Ephrati et al. | |
| 2008/0154763 A1 | 6/2008 | Alaia et al. | |
| 2008/0162285 A1 | 7/2008 | Tulloch et al. | |
| 2008/0162330 A1 | 7/2008 | Atkinson et al. | |
| 2008/0162331 A1 | 7/2008 | Ephrati et al. | |
| 2008/0162332 A1 | 7/2008 | Alaia et al. | |
| 2008/0183509 A1 | 7/2008 | Schloss | |
| 2008/0183614 A1 | 7/2008 | Gujral et al. | |
| 2008/0201254 A1 | 8/2008 | Sharma et al. | |
| 2008/0208616 A1 | 8/2008 | Young | |
| 2008/0300959 A1 | 12/2008 | Sinha et al. | |
| 2009/0099933 A1 | 4/2009 | Marhafer et al. | |
| 2009/0259650 A1 | 10/2009 | Schuil | |
| 2009/0292647 A1* | 11/2009 | Porat | G06Q 30/0601 705/80 |
| 2010/0017273 A1 | 1/2010 | Hommrich et al. | |
| 2010/0179860 A1 | 7/2010 | Noel et al. | |
| 2010/0268656 A1 | 10/2010 | Teicher | |
| 2011/0166951 A1 | 7/2011 | Abeshouse et al. | |
| 2011/0173093 A1 | 7/2011 | Psota et al. | |
| 2011/0219034 A1* | 9/2011 | Dekker | G06Q 10/10 707/780 |
| 2012/0036043 A1 | 2/2012 | Koch et al. | |

OTHER PUBLICATIONS

"Supply chain management: Rx software that kills the pain," Purchasing, Sep. 19, 2002 v131i15; ProQuest Dialog #92285762 21pgs.*

Palmer, Richard J. et al.: Technology-Driven Convergence of Business Processes in the Acquisition Cycle: Implications for Accountants and Educators,: Journal of Emerging Technologies in Accounting v8 2011, ProQuest Dialog #1017691573 24pgs.*

* cited by examiner

Identifying buyer information, by a commerce network server, wherein the buyer information includes at least one of a buyer need or a buyer profile, wherein the buyer need includes at least one of a commodity or service that the buyer has indicated a present need, and wherein the buyer profile includes at least self-reported information

510

↓

Identifying seller information, by the commerce network server, wherein the seller information includes at least one of a seller profile and tracked seller behavior, wherein the seller profile includes at least self-reported information and wherein the tracked seller behavior includes at least interest shown or responses of a seller to previously identified instances of buyer information

520

↓

Matching, by the commerce network server, the buyer with one or more sellers by matching the buyer information with the seller information

EVALUATION AND SELECTION OF QUOTES OF A COMMERCE NETWORK

RELATED APPLICATIONS

This patent application is a continuation-in-part (CIP) of U.S. patent application Ser. No. 13/632,031, filed Sep. 30, 2012, which is a continuation-in-part (CIP) of U.S. patent application Ser. No. 13/270,189, filed Oct. 10, 2011, which is a continuation-in-part (CIP) of U.S. patent application Ser. No. 13/176,020, filed Jul. 5, 2011, which claims priority to U.S. Provisional Patent Application No. 61/488,744 filed on May 22, 2011, which are all herein incorporated by reference.

FIELD OF THE DESCRIBED EMBODIMENTS

The described embodiments relate generally to a supplier/buyer commerce network. More particularly, the described embodiments relate to a methods, apparatuses and systems for evaluating and selecting quotes of a commerce network.

BACKGROUND

Commerce networks provide a means for electronically connecting buyers and suppliers. Buyers can enhance their supplier network by being electronically connected to many different suppliers. As a result, a buyer may be able to obtain better selection and pricing, and the suppliers may be able to realize additional sales.

Suppliers would like to provide information that describes the supplier capabilities online. Additionally, suppliers want to port their offline (brick-and-mortar) reputations, references, and provide potential new customers with the ability to interact with them further.

There is a need for systems, methods and apparatuses for a commerce network that evaluates and selects quotes of a commerce network.

SUMMARY

An embodiment includes a computer-method of electronically completing a commercial transaction. The method includes receiving, by one or more commerce network servers, a buyer-initiated demand for fulfillment of the commercial transaction, identifying suppliers to satisfy the buyer-initiated demand based on buyer policies and supplier characteristics, requesting quotes from the identified suppliers, receiving quotes from the identified suppliers, evaluating and selecting, by the one or more commerce network servers, one or more of the received quotes, wherein evaluating and selecting the one or more of the received quote comprises applying evaluating criteria to the received quotes, wherein the evaluation criteria includes applying a weighted combination of a plurality of evaluating factors, and facilitating presentation of the one or more selected quotes to the buyer.

Another embodiment includes a commerce network. The commerce network includes one or more commerce network servers. The one or more commerce network servers are operative to receive, a buyer-initiated demand for fulfillment of a commercial transaction, identify suppliers to satisfy the buyer-initiated demand based on buyer policies and supplier characteristics, request quotes from the identified suppliers, receive quotes from the identified suppliers, evaluate and select one or more of the received quotes, wherein evaluating and selecting the one or more of the received quote comprises applying evaluating criteria to the received quotes, wherein the evaluation criteria includes applying a weighted combination of a plurality of evaluating factors, and facilitate presentation of the one or more selected quotes to the buyer.

Another embodiment includes a program storage device readable by a machine, tangibly embodying a non-transitory program of instructions executable by the machine to perform a computer-method of electronically completing a commercial transaction.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a flow chart that includes steps of a computer-method of a commerce network for matching buyers and sellers, according to an embodiment.

DETAILED DESCRIPTION

Figure 1:
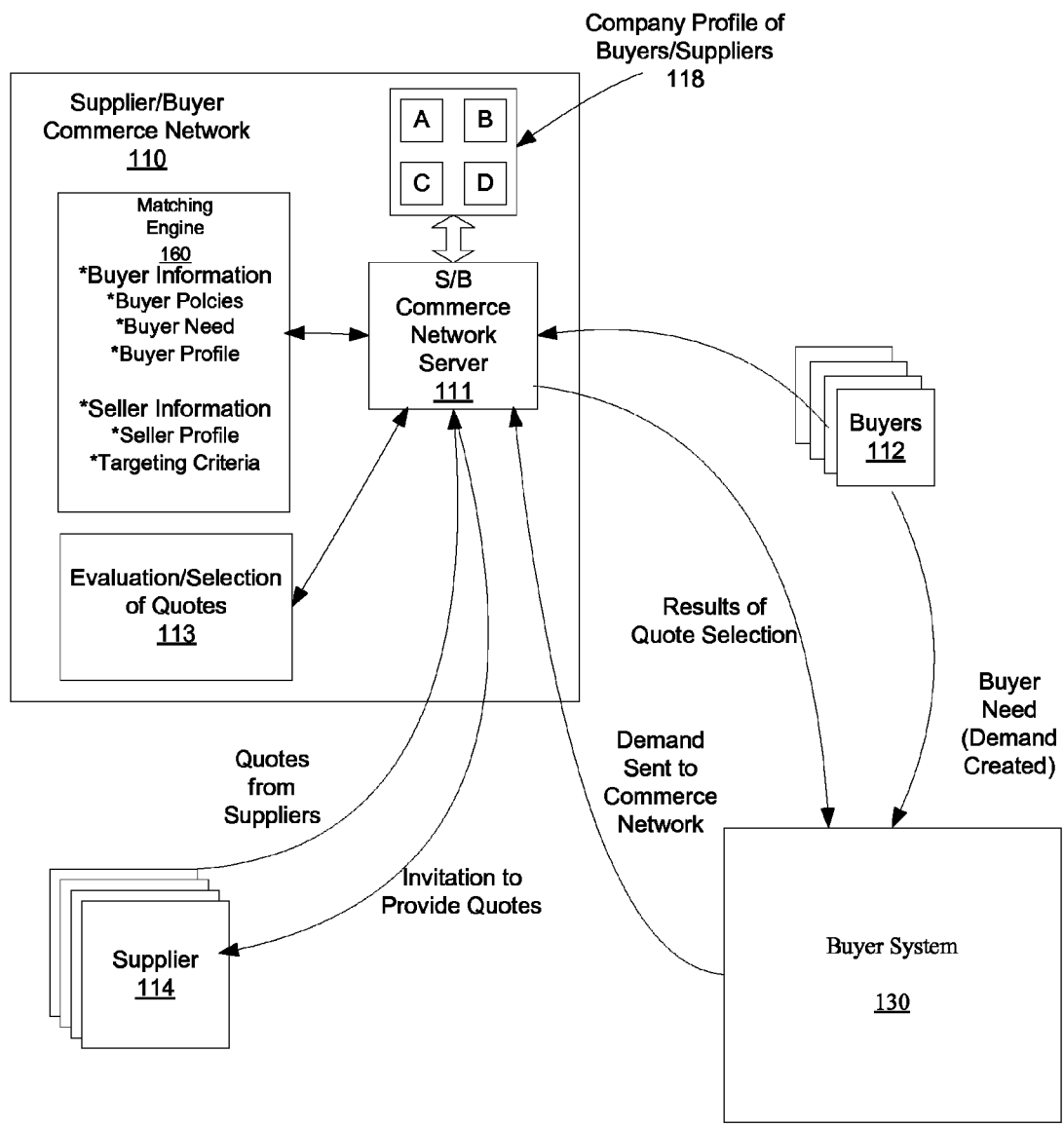
FIG. 1 shows a supplier/buyer commerce network that facilitates evaluation and selection of quotes of the commerce network, according to an embodiment.

The embodiments described include methods, systems and apparatuses for a supplier/buyer commerce network electronically evaluating and selecting quotes. The electronic evaluation of submitted quotes provides efficiency and ease of use to the buyers. That is, the quotes received by the buyer are screened, thereby providing only the highest quality (for example, best prices, compliance of quotes), custom quotes to the buyers. The disclosed embodiments intelligently expand the number of suppliers available to the buyer, and therefore, allow the buyer to obtain more favorable terms and broader selection. In addition, the disclosed embodiments provide a buyer with better quality quotes. For an embodiment, the quote evaluation and selection adaptively learns the buyer's behavior, allowing the quote evaluation and selection to provide the buyer with better quality, customized quotes.

For at least some embodiments, users (buyers) use email, fax, or phone to get quotes from suppliers, and typically work with suppliers they already know. Further, the user (buyers) may request a procurement department to get quotes. Further, the quotes may be tracked in emails and excels sheets and awarding is done manually. Further, a requisition or PO may be manually created and sent to the winning supplier. Short comings of these embodiments include sub-optimal user experience due to multiple manual steps and the time from requisition to purchase order is not optimal which can affect the business continuity. Further, there can be difficulty in finding suppliers to provide quotes. Other limitations include most users don't know preferred vendors, there is no easy way to find new vendors, most users end-up working only with supplier they already know, it is hard to implement "n-bids" and a buy, an optimal price is not achieved, and there is a loss of visibility because quotes are included in emails and excel spreadsheets. Further, valuable time and resources are spent by procurement department in fulfilling spot quotes.

However, at least some of the described embodiments address the above described issues by providing a solution that transforms an end-to-end process of quotation to purchase order for spot buys by providing a rich user experience for buyers and sellers along with an automated supplier matching, selection, and awarding process. Advantages provided by at least some of the described embodiments include a single user interface (UI) for sellers to quickly manage, evaluate and submit bids, a buyer UI to manage, evaluate and award bids, an automated matching to support n-bids and a buy from preferred and new vendors based on rules, and automated or manual awarding based on business rules.

The terms "supplier" and "seller" may be used interchangeably in the disclosure. The terms "buyer", "supplier" and "seller" may be used generally, but it is to be understood that for at least some embodiments, these terms represent a server, processor or one or more computing device that can be operated by a buyer or seller.

FIG. 1 shows a supplier/buyer commerce network 110 that facilitates evaluation and selection of quotes of the commerce network, according to an embodiment. The supplier/buyer network 110 includes a commerce network server 111 that manages buyers 112 and suppliers 114. For an embodiment, the commerce network server 111 receives a buyer need (for example, a request for a good or service). For an embodiment, the supplier/buyer network 110 includes a matching engine 160 that selects suppliers in which quotes to the buyer need are to be requested. A quote evaluation and selection engine 113 culls the received quotes to improve the quality of quotes provided to buyers. The supplier/buyer network 110 further manages company profiles 118 of the buyers and the sellers.

As shown, for an embodiment, a buyer system 130 provides an interface between a buyer user 112 and the supplier/buyer network 110. Through the buyer system 130, a buyer need (demand created) is propagated from a buyer user 112 to the supplier/buyer network 110.

The matching engine 160 identifies potential suppliers by matching the buyer and sellers using buyer information and supplier information. The matching engine 160 is shown as being separate from the commerce network server 111. For at least some embodiments, the matching engine 160 and the commerce network server 111 are implemented on a single server, processor or computing device. For other embodiments, the matching engine 160 and the commerce network server 111 are implemented over multiple servers. For at least some embodiments, the servers include processors, controllers and/or any other type of computing device.

An embodiment includes identifying buyer information, by the commerce network server 111, wherein the buyer information includes at least one of a buyer need or a buyer profile. For an embodiment, the buyer need includes at least one of a good or service that the buyer has indicated a present need. The terms good and service can be generally designated as a commodity. For an embodiment, the buyer profile includes at least self-reported information.

An embodiment includes identifying seller (supplier) information, by the commerce network server 111, wherein the seller information includes at least one of a seller profile and tracked seller behavior. For an embodiment, the seller profile includes at least self-reported information. For an embodiment, the tracked seller behavior includes at least interest shown or responses of a seller to previously identified instances of buyer information.

For an embodiment, the commerce network server 111 receives a buyer-initiated demand for fulfillment of the commercial transaction. For at least some embodiments, the buyer-initiated demand includes at least one of an item or service for purchase, a place of delivery, a delivery date, a quantity, and expected price.

The matching engine 160 provides a selection of potential buyers based on buyer information, supplier information and the buyer-initiated demand. For at least some embodiments, the buyer information and the supplier information includes buyer policies and supplier characteristics, such as, a list of approved suppliers, locations of suppliers, certifications of suppliers, prior performance of suppliers, and/or prices of suppliers.

For at least some embodiments, once the potential suppliers are identified, the identified potential suppliers are provided with an invitation to provide quotes in response to the buyer need or demand.

Quotes are then received from at least a subset of the identified potential suppliers. For at least some embodiments, the received quotes are then evaluated and/or selected by the evaluation and selection engine 113.

Evaluation and Selection of Received Quotes

For at least some embodiments, evaluating and selecting one or more of the received quote includes applying evaluating criteria to the received quotes, wherein the evaluation criteria includes a weighted combination of a plurality of evaluating factors. Exemplary evaluating factors include price criteria, QoS (Quality of Service) criteria, delivery time criteria, size of the supplier, location, order amount, contract compliance, and/or relationship status.

Adaptive and Learned Behavior

As previously stated, for an embodiment, evaluating and selecting one or more of the received quote includes applying evaluating criteria to the received quotes, wherein the evaluation criteria includes a weighted combination of a plurality of evaluating factors. For an embodiment, the weighting of the weighted combination is adaptively selected based on monitoring and tracking of prior buyer behavior during prior transactions. That is, the evaluation and selection becomes more automated as the buyer behavior is analyzed. For an embodiment, the evaluation and selection becomes less manual over time (that is, the buyer's input via a manual selection is required less) as the supplier/ buyer commerce network 110 learns the buyer's behavior and preferences. Over time, the evaluation and selection of quotes becomes more automated as the buyer's behavior and characteristics are tracked, monitored and learned.

For an embodiment, the manual process of the buyer begins when the buyer uploads supplier information. For an embodiment, the buyer does this by updating or modifying the supplier profile. As describe, the supplier can additionally supplement or updated this information. For an embodiment, the supplier performs this by updating the supplier profile of the supplier. Additionally, for an embodiment, the buyer enters, updates, or modifies criteria used for the matching process.

More specifically, for at least some embodiments, the quote selection process includes a buyer uploading seller information into the supplier/buyer commerce network 110. Next, the supplier is afforded an opportunity to enhance the information from his/her perspective. Next, the buyer provides basic rules for matching or at least some rules. The buyer submits a request for quote to the supplier/buyer commerce network 110. The supplier/buyer commerce network 110 matches the buyer with suppliers, and then provides the quote to the matched suppliers. Responses to the quotes are received from at least a portion of the matched suppliers. The buyer then has the option of manually selecting from the received quotes, or the buyer can choose for the supplier/buyer commerce network 110 to automatically select the winning quote. For an embodiment, the supplier/buyer commerce network 110 selects the winning quote based on configured criteria. For an embodiment, the supplier/buyer commerce network 110 determines the configuration criteria.

An embodiment includes the buyer selecting when the supplier/buyer commerce network 110 automatically selects the winning bid, and when the buyer is to select the winning bid. For example, the buyer may prefer (select from a quote selection configuration) that the supplier/buyer commerce network 110 select winning bids if the order is for less than a threshold amount of money (such as, $1000), and the buyer selects the winning bid if the order is for greater than the threshold amount. For an embodiment, the threshold is adaptively selected by the buyer. Other embodiments that include the supplier/buyer commerce network 110 selecting winning bids versus the buyer selecting the winning bids include, for example, whether the order includes a particular commodity, or a particular location. That is, the buyer may want to select the winning bid for a more personal commodity, such as, a computer, but may opt for the supplier/buyer commerce network 110 to select winning bids, for example, for pencils and pens. As previously stated, by the supplier/buyer commerce network 110 monitoring the manual selections of the buyer, the supplier/buyer commerce network 110 can refined, update and improve the automated selections. As noted, for at least some embodiments, the monitoring of the buyer preferences is used for both matching the buyer with suppliers, and for selecting winning quotes from the suppliers.

As previously stated, for an embodiment, the weightings of the evaluating factors are adaptively updated over time. For an embodiment, greater weightings are given to evaluation criteria that are deduced to be of greater importance to the buyer based on prior actions of the buyer, and lesser weightings to evaluation criteria that are deduced to be of lesser importance to the buyer based on the prior actions of the buyer. For example, a buyer's preferred location can be deduced by monitoring where past deliveries are made. A buyer's sensitivity to price or price preference can be deduced by the buyer's reaction when presented with pricing options. For an embodiment, the evaluating criteria include at least two of a price criteria, a quality of service (QoS) criteria, and/or a delivery time criteria.

Product and/or service quality preferences can be deduced as well. Based on prior quote selections by the buyer, it can be deduced, for example, that the buyer always prefers a Supplier-1 for paper in California, or prefers small suppliers for small orders (therefore, the automated quoted selection in the future would provide greater weighting for suppliers larger than a first threshold for orders greater than a second threshold, and suppliers smaller than a third threshold for orders smaller than a fourth threshold). Other examples of weighting of evaluation criteria based on monitoring of actions of the buyer could include, for example, weighting Qos (Quality of Service) for particular supplier quotes depending upon the commodity being requested by the buyer. For example, a commodity laptop buyer may focuses on QoS more than delivery time. The QoS can be established based on feedback of other buyers, which can be, for example, included within the supplier profile. Further, threshold levels of the QoS can be established for categorizing the supplier.

Other examples of weighting of evaluation criteria based on monitoring of actions of the buyer include, for example, weighting (greater weighting) for quotes for suppliers with NDA (non-disclosure agreement) for printing services. Further, weighting of quotes may also reflect, for example, that the buyer is open to public suppliers, such as, for buying pencils.

As previously described, the weighting of each of the evaluating criteria is adaptively updated over time. For an embodiment, weighting of the weighted combination is adaptively selected based on monitoring and tracking of prior buyer behavior during prior transactions.

Embodiments of the buyers 112 and the supplier 114 are enterprise networks that include enterprise servers. That is, the buyers 112 and suppliers 114 can be represented by buyer servers and supplier servers. The enterprise servers of the buyers 112 and the supplier 114 are network connected (through, example, the internet) to the supplier/buyer commerce network 110. The supplier/buyer commerce network 110 can include one or more servers (such as, S/B commerce network server 111) that support the described embodiments for electronically matching buyers and suppliers. Embodiments of each of the servers include processors, controllers and/or other computing devices.

For an embodiment, the buyers 112 are associated with the supplier/buyer commerce network 110 in some capacity. That is, the buyers 112 have registered or previously interacted with the commerce network 110, or the commerce network 110 has a profile of the buyers 112. However, suppliers 114 are not so limited. That is, the suppliers 114 can be either associated (enabled) or not associated (not enabled) with the supplier/buyer commerce network 110. A first type of supplier 114 is associated with the supplier/buyer commerce network 110, while a second type of supplier 114 is not directly associated with the supplier/buyer commerce network 110, but can be reached through other networks (through, for example, the internet), social media, direct marketing, etc. For an embodiment, the seller profile includes at least two parts. A first part is directly managed by sellers, for example, commodities, locations, and/or certificates. A second part focuses on buyer-seller relationship and is managed by the buyer, for example, contract start date, contract end date, and/or commodity-location affinity.

Company (Buyer and Supplier) Profiles

For at least some embodiments, the company profile 118 includes at least four quadrants that include at least a first quadrant (A) that includes self-reported information, a second quadrant (B) that includes community information, a third quadrant (C) that includes third party information, and a fourth quadrant (D) that includes aggregated activity information. It is to be understood that for some embodiments the company profile can include a subset of these quadrants, and for other embodiments, the company profile can include information in addition to the information of these four quadrants. The company profile 118 is a collection of information pertaining to the corresponding company that is associated with the network. The company profile allows other companies (suppliers 114 and/or buyers 112) to evaluate the company associated with the company profile 118. Clearly, the company profile can include fewer or more than the four quadrants.

For an embodiment, a match is driven by a buyer need. That is, a buyer states their need, and that stated need is matched with one or more sellers. The match can be electronically communicated to the one or more sellers, and the sellers can subsequently respond. The seller responses can then be electronically communicated to the buyer. The electronic communication can be made to the suppliers by, faxing, phoning, tweeting, a small message system (sms), an RDF site summary (RSS) feeds, an application programming interface (API) based integration, and/or third party integrations. Advantageously, the suppliers are provided with an opportunity that includes a buyer that is presently within a buying cycle. That is, the buyer is seeking a good or service that the supplier provides at the time the supplier receives the electronic introduction.

For another embodiment, a match is seller driven. That is, sellers indicate their capabilities and target customers. The matching engine then presents appropriate sellers to buyers based on the seller information and buyer information.

For other embodiments, the communication of buyer needs to sellers can include uploading the information on the buying opportunity to a website that is accessible by the selected set (additionally or alternatively, the website can be available to any supplier) of suppliers through, for example, the internet, phone applications and/or tablet applications. The selected set of suppliers can be directed to the website through various methods. For example, the suppliers can each be sent an email that includes a link to the website.

Embodiments include the company profile 118 being adaptively updated (by, for example, a commerce network server 111) as the company associated with the company profile 118 interacts with buyers 112, and/or suppliers 114. The company profile 118 can advantageously be used to generate a score for the company and/or match the company with other companies associated with the supplier/buyer commerce network 110, and further to improve the quote selection process. The company profile 118 is generally stored within a database associated with the supplier/buyer commerce network 110.

While the embodiments described are directed to a single company profile 118, it is to be understood that at least some of the described embodiments include multiple company profiles. For embodiments, each company profile corresponds with a different company associated with the supplier/buyer commerce network 110. The different company profiles provide a means for contrasting (for example, scoring) the different companies. Additionally, the different company profiles can be used to proactively match companies (suppliers 114 and buyers 112) associated with the supplier/buyer commerce network 110, and adaptively influence the quote evaluation and selection.

For embodiments, pieces of the self-reported information are used to drive additional processes in the supplier/buyer commerce network which can aid and supplement the matching and quote selection. Initially, the self-reported information is typically focused on general company capabilities (commodities, company size, locations, revenues, etc.). However, the self-reported information can additionally include such things as target customer segments that, for example, a seller wants to sell to. Additionally, as will be described, a matching process engine can analyze commodities (goods & services) a supplier has selected as providing, and the sales territories of the supplier, in order to match that supplier's profile against the business opportunities.

The community information (quadrant B) includes information that pertains to the company that is provided by suppliers 114 and buyers 112 associated with the network. The community information includes, for example, ratings. The ratings allow, for example, a buyer to rate any supplier that has responded to a business opportunity on the supplier/buyer commerce network 110, which can be reflected in a company score the aids the matching and the quote selection.

The third party information (quadrant C) includes information that pertains to the company that is provided by a third party 170 about a buyer or seller. The third party information includes, for example, a business and credit rating provided by, for example, an established rating agency (such as, Dun & Bradstreet® (D&B)). The third party information can include financial risk information about suppliers. This can be provided, for example, using self-reported DUNS number information. The DUNS information can be validated with D&B using an API call. The validated information can be displayed back to the supplier for their approval. Once approved, the supplier/buyer commerce network basically has the supplier linked to a risk profile on D&B. Again, all of the third party information can be used to influence a company score that can be used to aid matching of suppliers and the evaluation and selection of received quotes.

The aggregated activity information (quadrant D) includes, for example, transactional activity of the company. The aggregated activity information includes information about suppliers and their performance on the supplier/buyer commerce network 110.

A useful piece of aggregated activity information that is included within the company profile what commodity the company has either bought, sold, have or had a contract to buyer or sell. Additionally, the aggregated activity information can include the number of transacting relationships that the company has with buyers/suppliers 112, 114 on the supplier/buyer commerce network 110, and/or transacting relationships the company has with buyers/suppliers of other commerce networks, such as a cloud network. This information provides a valuable picture of how many other companies the company is actively doing business with via the supplier/buyer commerce network 110, and the cloud network. Other examples of aggregated activity information include, but are not limited to, event invitations, invitations by revenue, transaction awards (for example, winning supplier bids), revenue ranges, and/or top bids by industry.

The interface between the supplier/buyer commerce network 110 and cloud networks allows the supplier/buyer commerce network 110 to glean additional information that can be useful for enhancing the value of the company profile 118. For example, cloud networks can include sourcing and/or contract information and data. These embodiments determine commonality of suppliers/buyers across multiple private cloud networks. For at least some embodiments, the different companies (buyer/sellers) are assigned unique identifiers by, for example, a unique ID engine, which allows the generation of a single view of the companies' behavior across multiple interactions (across the supplier/buyer commerce network 110 and the cloud networks). That is, for embodiments, one or more databases are associated with networks that maintain transactional activity of the company with other companies, and this transaction information for the company is identified by the unique identifier of the company. The unique ID engine can be operable, for example, on a server that is networked to the supplier/buyer commerce network 110.

Figure 2:
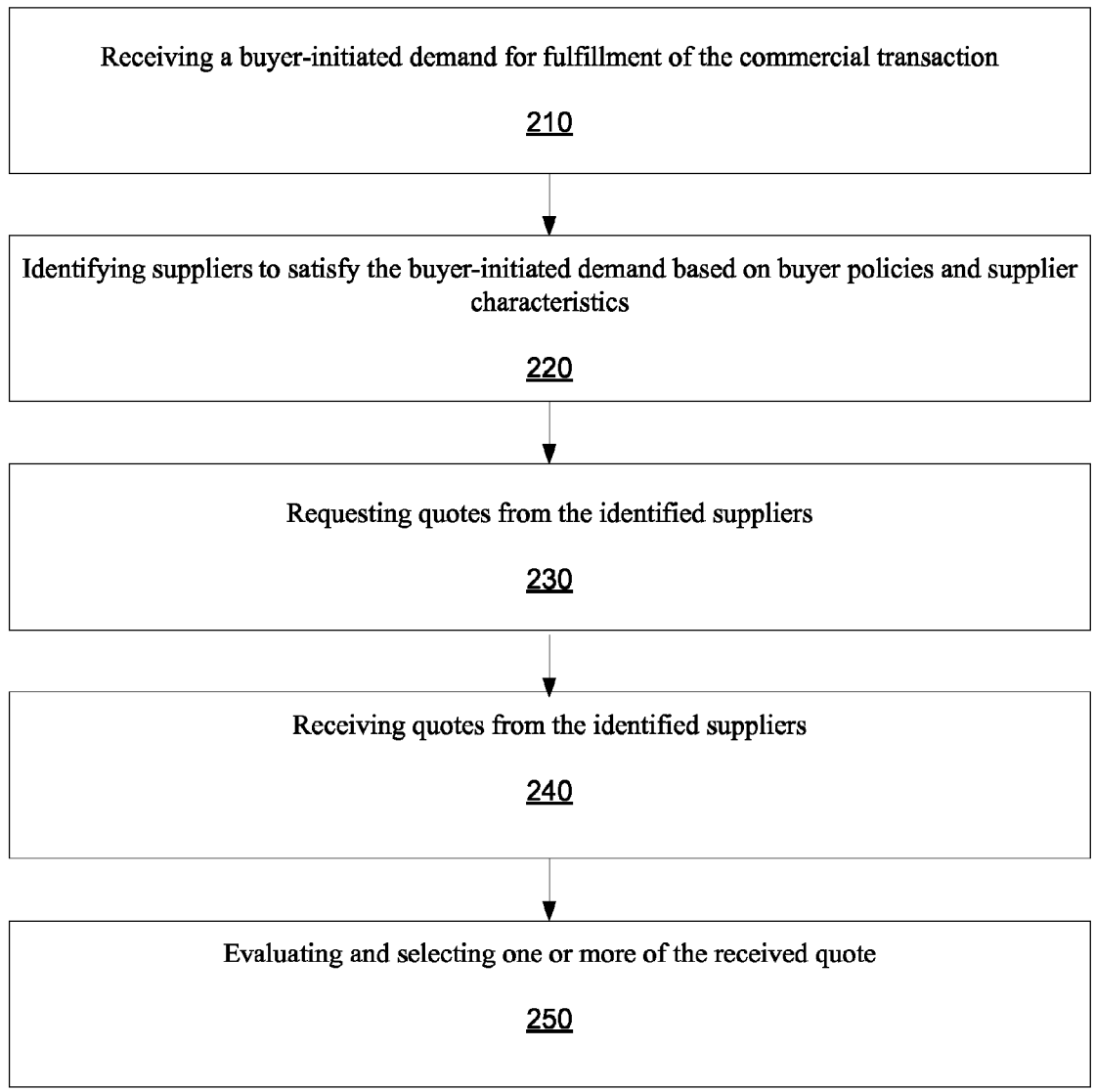
FIG. 2 is a flow chart that includes steps of a computer-method of a commerce network for evaluating and selecting quotes, according to an embodiment.

FIG. 2 is a flow chart that includes steps of a computer-method of a commerce network for matching buyers and sellers, according to an embodiment. A first step 210 includes receiving a buyer-initiated demand for fulfillment of the commercial transaction. A second step 220 includes identifying suppliers to satisfy the buyer-initiated demand based on buyer policies and supplier characteristics. A third step 230 includes requesting quotes from the identified suppliers. A fourth step 240 includes receiving quotes from the identified suppliers. A fifth step 250 includes evaluating and selecting one or more of the received quote, wherein evaluating and selecting the one or more of the received quote comprises applying evaluating criteria to the received quotes, by one or more commerce network servers, wherein the evaluation criteria includes a weighted combination of a plurality of evaluating factors. Finally, the one or more selected quotes are presented to the buyer.

As previously described, for an embodiment applying the evaluating criteria to the received quotes comprises evaluating prior selections of received quotes and adaptively updating the weighted combination of the plurality of evaluating factors based on the evaluated prior selections.

As previously described, for an embodiment the weighted combinations include greater weightings for evaluation criteria that are deduced to be of greater importance to the buyer based on prior actions of the buyer, and lesser weightings for evaluation criteria that are deduced to be of lesser importance to the buyer based on the prior actions of the buyer. That is, prior actions by the buyer are categorized, and used to automatically determine which evaluation criteria are important to the buyer, and which are not important to the buyer. Based on the deduced importance, the weighting of the evaluation criteria are selected. As previously described, for an embodiment the evaluating criteria include at least two of a price criteria, a quality of service (QoS) criteria, and a delivery time criteria. Further, as described, for an embodiment, weighting of the weighted combination is adaptively selected based on monitoring and tracking of prior buyer behavior during prior transactions. As a result, the evaluation becomes more automated over time as the buyer behavior is analyzed and buyer behavior is learned.

For at least some embodiments, the buyer-initiated demand includes at least one of an item or service for purchase, a place of delivery, a delivery date, a quantity, and expected price.

For at least some embodiments, the buyer policies and supplier characteristics include at least one of approved suppliers, location of supplier, certification of supplier, prior performance of supplier, price of supplier.

For at least some embodiments, requesting quotes from the identified suppliers includes electronically requesting the identified suppliers to provide a quote. For an embodiment, identifying suppliers to satisfy the buyer-initiated demand includes matching the suppliers with business rules of the buyer.

As described, for at least some embodiments, identifying suppliers to satisfy the buyer-initiated demand includes identifying buyer information, by one or more commerce network servers, wherein the buyer information includes at least one of a buyer need or a buyer profile, wherein the buyer need includes at least one of a commodity or service that the buyer has indicated a present need, and wherein the buyer profile includes at least self-reported information, identifying supplier information, by the one or more commerce network servers, wherein the supplier information includes at least one of a supplier profile and tracked supplier behavior, wherein the supplier profile includes at least self-reported information and wherein the tracked supplier behavior includes at least interest shown or responses of a supplier to previously identified instances of buyer information, and identifying suppliers to satisfy the buyer-initiated demand, by the one or more commerce network servers, comprising matching the buyer information with the supplier information. Further, for at least some embodiments, identifying suppliers to satisfy the buyer-initiated demand includes applying at least a portion of the evaluation criteria of received quotes to identify suppliers.

Figure 3:
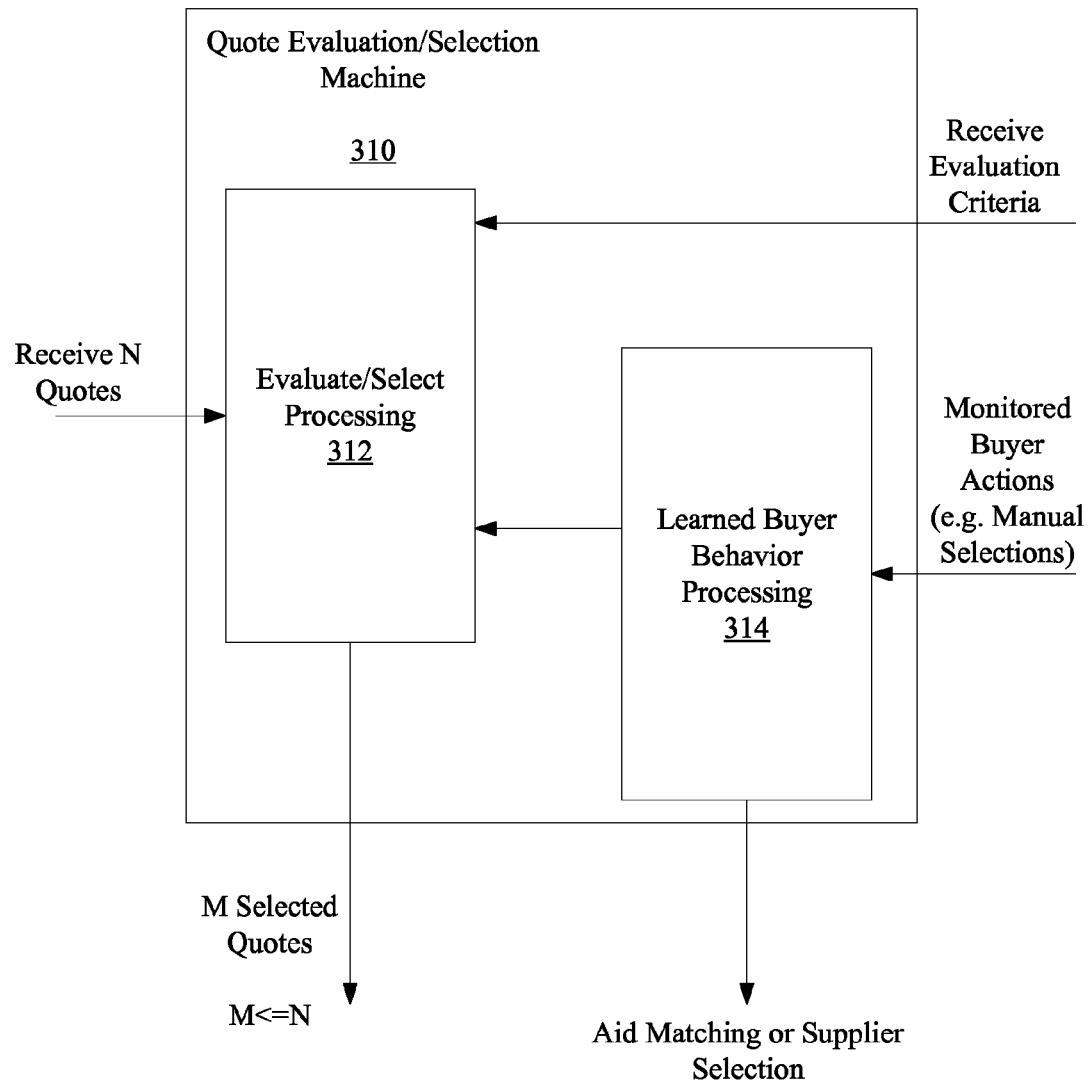
FIG. 3 shows a block diagram of a process of evaluating and selecting a quote, according to an embodiment.

FIG. 3 shows a block diagram 310 of a process of evaluating and selecting a quote, according to an embodiment. As shown, a quote evaluation and selection engine 312 receives N quotes from the suppliers. Further, the quote evaluation and selection engine 312 receives evaluation criteria, and learned behavior information about the buyer. For at least some embodiments, the learned behavior information includes the buyer profile. Based on the evaluation criteria and the learned buyer behavior, the quote evaluation and selection engine 312 culls the received quotes, and provides higher quality quotes to the buyer.

For at least some embodiments, the quote selection process includes a buyer uploading seller information into the supplier/buyer commerce network 110. Next, the supplier is afforded an opportunity to enhance the information from his/her perspective. For an embodiment, both the buyer provided information and the supplier provided information is included within the company profiles. Next, the buyer provides basic rules for matching or at least some rules. The buyer submits a request for quote to the supplier/buyer commerce network 110. The supplier/buyer commerce network 110 matches the buyer with suppliers, and then provides the quote to the matched suppliers. Responses to the quotes are received from the suppliers. The buyer then has the option of manually selecting from the received quotes, or the buyer can choose for the supplier/buyer commerce network 110 to automatically select the winning quote. For an embodiment, the supplier/buyer commerce network 110 selects the winning quote based on configured criteria. For an embodiment, the supplier/buyer commerce network 110 determines the configuration criteria. For an embodiment, the buyer can select when the supplier/buyer commerce network 110 automatically selects the winning bid, and when the buyer is to select the winning bid. For example, the buyer may prefer (select from a quote selection configuration) that the supplier/buyer commerce network 110 select winning bids if the order is for less than a threshold amount of money (such as, $1000), and the buyer selects the winning bid if the order is for greater than the threshold amount. Other supplier/buyer commerce network 110 selection of winning bids versus buyer selection of winning bids determiner include, for example, whether the order includes a particular commodity, or a particular location. That is, the buyer may want to select the winning bid for a more personal commodity, such as, a computer, but may opt for the supplier/buyer commerce network 110 to select winning bids, for example, for pencils and pens. As previously stated, by the supplier/buyer commerce network 110 monitoring the manual selections of the buyer, the supplier/buyer commerce network 110 can refined, update and improve the automated selections. As previously described, the monitoring of the buyer preferences can be used for both matching the buyer with suppliers, and for selecting winning quote from the suppliers.

The learned behavior information is generated by a learned buyer behavior engine 314. For at least some embodiments, the learned buyer information is provided to the quote evaluation and selection engine 312, the matching engine 160, or both the quote evaluation and selection engine 312 and the matching engine 160. That is, the suppliers in which the buyer demand is submitted to can be refined based on the learned buyer behavior, and the quality of the received quotes that are presented to the buyer can be refined.

Figure 4:
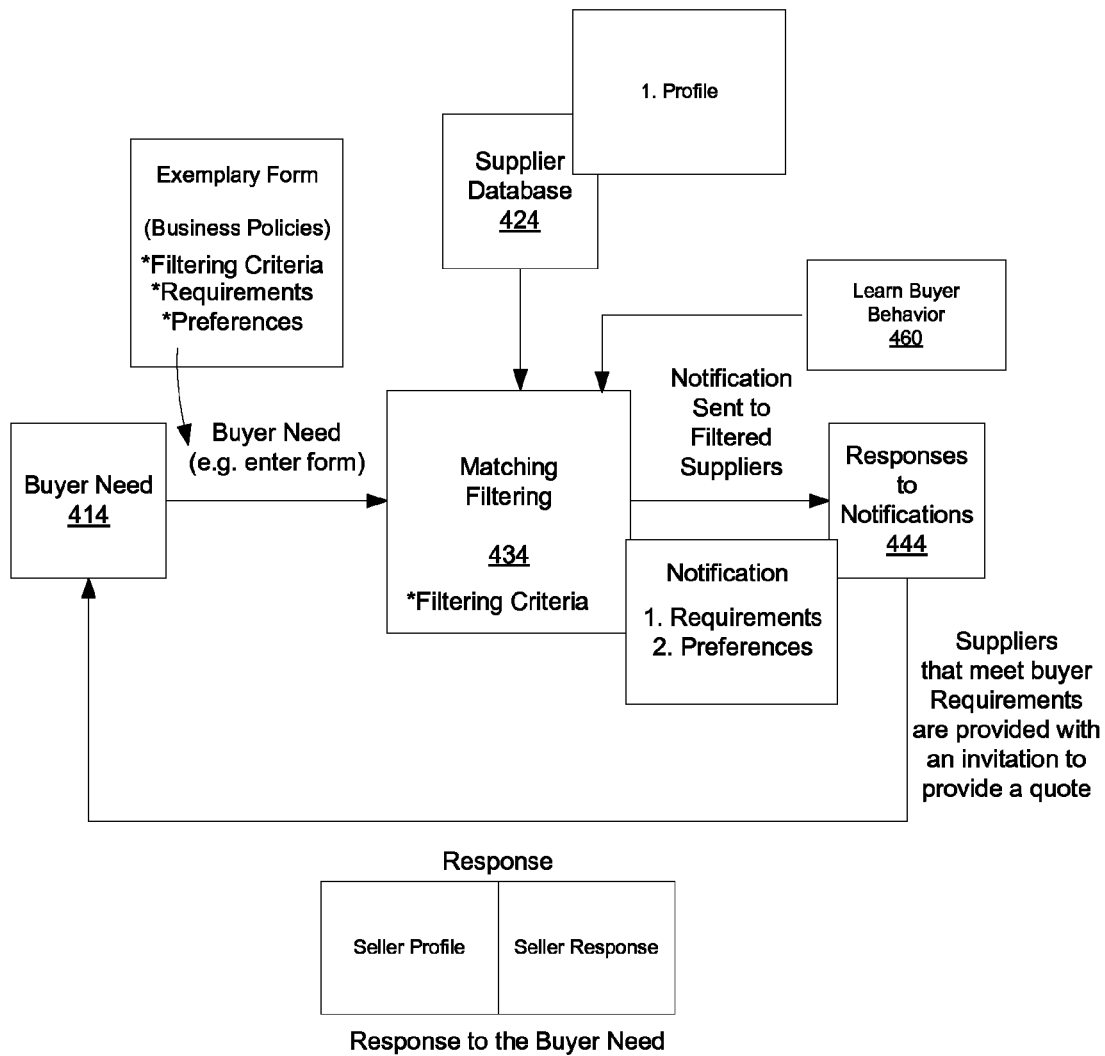
FIG. 4 shows is a block diagram that functionally shows a buyer being matched with one or more suppliers, according to an embodiment.

FIG. 4 shows is a block diagram that functionally shows a buyer being matched with one or more suppliers, according to an embodiment. A buyer need 414 is submitted by a buyer through, for example, a buyer-need form. An exemplary form includes business policies, and filtering criteria (such as, requirements and preferences). Matching filtering 434 matches the buyer need 414 with supplier information of a supplier database 424. For embodiments, the filtering only passes sellers that meet absolute filter criteria as set, for example, by the buyer need 414. An embodiment of the seller database 424 includes seller profiles and the tracked seller behavior. For an embodiment, a notification is sent to the suppliers that meet the filtering requirements. A response to notification engine 444 allows the matched sellers that additionally meet buyer specified requirements (qualifications) to respond to the notification. For at least some embodiment, responses to the notification include answers to buyer-provided qualification questions and/or seller profile.

For an embodiment, the matching of the matching filtering 434 additionally includes an input from the learned buyer behavior 460.

For an embodiment, the buyer need 414 most importantly includes a commodity code (category of the good or serviced need) and location (where they want the good or service to be delivered) Additionally, the buyer need 414 may include filtering criteria and requirements that all responding sellers much meet, such as quality certifications, or business types (for example, the buyer may only want manufacturers to respond). The buyer need 414 may also include preferences (that is, characteristics) that the buyer would prefer, but are not exclusionary (such as diversity status, company size, etc.). The buyer need 414 may also include detailed information about what is needed, such as technical specifications, drawings, delivery requirements, location of manufacturing facility, brand requested, etc.

For an embodiment, the buyer is only matched with suppliers has contract with. For an embodiment, the buyer is matched based on commodity-location affinity as described by the buyer (not supplier). For an embodiment, the buyer is matched based on prior quote selection (this is covered I believe)

Embodiments of the matching filtering 434 include matching against commodity codes. For this embodiment, a hierarchical taxonomy is used to specify buyer needs. Based on the level of taxonomy selection (more general or more specific), matching algorithms may match more broadly ("up the commodity tree"). Matching to suppliers is based on the commodity code selected by the supplier and buyer. This matching filter precision may vary based on different parts of the "commodity tree" where a commodity tree density varies.

Embodiments of the matching filtering 434 occur with respect to location of the service or good to be delivered, either on a global, regional (e.g. North America), country, state, metropolitan or city level.

As shown, an embodiment of the supplier database 424 includes at least the profile of the supplier.

For at least some embodiments, the suppliers that meet the matching filtering and requirements, and provided with an invitation to provide a quote in response to the buyer need or demand. The received quotes are then evaluated and selected by the processing engine 312. For at least some embodiments, the selected responses are presented to buyers in some priority order. That prioritization can be based on an aggregated score, wherein the aggregated score is determined, for example, on a quality of the match, general supplier quality, bid price, date of response. As shown, an embodiment of the response includes the seller (supplier) profile and the seller's response.

FIG. 5 is a flow chart that includes steps of a computer-method of a commerce network for matching buyers and sellers, according to an embodiment. A first step 510 includes identifying buyer information, by one or more commerce network servers, wherein the buyer information includes at least one of a buyer need or a buyer profile, wherein the buyer need includes at least one of a commodity or service that the buyer has indicated a present need, and wherein the buyer profile includes at least self-reported information. A second step 520 includes identifying seller information, by the one or more commerce network servers, wherein the seller information includes at least one of a seller profile and tracked seller behavior, wherein the seller profile includes at least self-reported information and wherein the tracked seller behavior includes at least interest shown or responses of a seller to previously identified instances of buyer information. A third step 530 includes matching, by the one or more commerce network servers, the buyers with sellers by matching the buyer information with the seller information. For at least some embodiments, the buyer need includes required buyer needs and preferred buyer needs. For at least one embodiment, the tracked seller behavior further includes seller preferences. An embodiment further includes presenting one or more matched buyers to the seller, or presenting one or more matched sellers to the buyer depending upon the criteria of the quote evaluation and selection. For an embodiment, each buyer need includes multiple levels of commodity classifications.

As previously described, for an embodiment, the buyer profile further includes community information, third party information, and aggregated activity information. For an embodiment, the aggregated activity information includes buyer activity information obtained by harvesting of buyer activity. For at least some embodiments, the seller profile further includes community information, third party information, and aggregated activity information.

An embodiment further includes receiving, by the one or more commerce network servers, the buyer need from the buyer, and generating, by the one or more commerce network servers, a buying need posting based on the buyer need, wherein the buying need posting includes a plurality of levels of classification for matching the buying need. For at least some embodiments, the levels for classification for matching include an absolute filter criteria (note that this can include inputs from both the buyer and the seller), buyer-specified requirements of good or service needed, buyer preferences on type or classification of sellers, or buyer-provided pre-qualifications.

For at least some embodiments, the buyer need includes at least one of a commodity, a location, a seller capability and required seller characteristics. For an embodiment, the seller capability includes capabilities directed to process used, quantity, product specifications etc. For at least some embodiments, the plurality of levels of classification include an absolute filter criteria, a requirement criteria, and a preferences criteria, wherein the absolute filter include criteria that the seller (assume per the seller profile) must meet in order to result in a match, the requirement criteria includes requirements a sellers response (to confirm the match) must include, and the preference criteria includes certain preferences desired by the buyer.

For at least some embodiments, matching the buying need includes matching the buyer need posting with one or more sellers, including filtering sellers of a seller database, wherein the filtering only passes sellers that meet absolute filter criteria, wherein the seller database includes seller profiles and the tracked seller behavior, and notifying the matched sellers. At least some embodiments further include allowing one or more of the matched sellers that additionally meet buyer specified requirements to respond to the notification. For at least some embodiment, responses to the notification include answers to buyer-provided pre-qualification questions.

At least some embodiments further include generating a plurality of recommendation buckets, wherein each recommendation bucket includes a ranked list of suppliers for one or more of a plurality of commodities and services. Further, at least some embodiments include allowing suppliers to set preferences on buyer types to be matched. That is, suppliers are allowed to set preferences on types of buyers, such as, industry, company size, etc. to be matched with, thereby allowing targeting outside of the company profiles. At least some embodiments further include generating a projection of buyer needs based on buyer activity information. At least some embodiments further include generating a summary distribution of the buyer activity that includes a real-time adaptive distribution of commodities and services purchased by the buyer. For at least some embodiments, matching comprises matching the buyer with one or more sellers, including matching the summary distribution of the buyer activity of the buyer with plurality of recommendation buckets.

For an embodiment, the electronically harvested information includes commodity information, a response time-line, a product amount, and location information. Additionally, the harvested information can include information about the buyer which can be presented anonymously.

For an embodiment, electronically harvesting information includes maintaining a company profile of each of the buyers. For a specific embodiment, maintaining a company profile of each of the buyers associated with the supplier/buyer commerce network includes collecting activity information of the buyer. For an embodiment, collecting activity information of the buyer includes monitoring a plurality of databases that each maintains activity information associated with the buyer, assigning a unique identification for the company across the plurality of databases, exporting the activity information associated with the buyer from each of the plurality of databases, and aggregating the activity information. The company profile of the buyer is updated with the aggregated activity information of the company. For an embodiment, the company profile of the buyer further includes at least one of community information, self-reported information and third party information.

For an embodiment, anonymizing the harvested information includes redacting information within the harvested information that could be used to identify the buyer. For an embodiment, the harvested information in anonymized as selected by the buyer. The buyer can select the information to be minimally anonymous, or not anonymous at all.

Embodiments further include summarizing the harvested buyer information. This can include, for example, adding selected information. The added back information includes information about the buyer, for example, RFI/RFQ/Reverse Auction, Commodities, Location, Project Size, Industry, Revenue, State, employees, years in business, dollar amounts sourced on buyer/seller commerce network, typical commodities sourced. Additionally, it is to be understood that summarizing here can additionally include substituting information. For example, a buyer may be interested in buying beakers. The summarizing can include replacing the product term with a more generic term, such as, laboratory equipment. For non-anonymous versions, the buyer profile can be published. For embodiments, the added selected information is information associated with identification of a buying opportunity.

For an embodiment, selecting the set of suppliers includes identifying suppliers of goods or services that are similar to the goods or services desired by the at least one buyer, and/or identifying suppliers of goods or services that are located proximate to the at least one buyer.

For an embodiment, selecting the set of the suppliers includes maintaining a company profile of each of the suppliers, and identifying suppliers that match a company profile of the buyer. For an embodiment maintaining the company profile of each of the suppliers associated with the supplier/buyer commerce network includes collecting activity information of the supplier. For an embodiment, collecting activity information of the supplier includes monitoring a plurality of databases that each maintains activity information associated with the supplier, assigning a unique identification for the company across the plurality of databases, exporting the activity information associated with the buyer from each of the plurality of databases, and aggregating the activity information. The company profile of the supplier is updated with the aggregated activity information of the company.

As described, embodiments for presenting the anonymously harvested information to the selected set of the suppliers include electronically communicating the anonymously harvested information to each of the selected set of the suppliers. The electronic communication can be of one or more of many different forms, such as, emailing the anonymously harvested information to the selected set of suppliers. Other example of electronic communication include, but are not limited to, faxing, phoning, tweeting, sms messaging, RSS feeding, communicating through API based integration, and/or communicating through third party integrations.

As described, an embodiment for presenting the anonymously harvested information to a selected set of the suppliers, includes uploading the anonymously harvested information to a website that is accessible by the selected set of suppliers. The website can be accessed through one of many different means, such as, through the internet (web), through a mobile device, smart phone application and/or tablet applications.

As described, for an embodiment facilitating formation of a business relationship between suppliers who express an interest and the at least one buyer includes providing an electronic link to the buyer within an email. Clearly, the link can be communicated in other ways, such as, described above.

An embodiment includes aggregating the electronic introductions of buyers and suppliers. For an embodiment, the aggregating is based on certain attributes, and further includes presenting the harvested information. Examples of attributes include types of commodities, locations, industries, and/or project costing amounts. The publishing makes the aggregated data available, for example, to those who are doing industry research and/or benchmarking.

Embodiments include electronically communicating a buyer response digest to the buyer which includes the aggregated electronic introductions, providing a method for the buyer to respond to at least one of the aggregated electronic introductions. The digest provides a convenient way for the buyer to search, review and respond to one or more electronic introductions of an aggregation of electronic introductions received from the suppliers.

For embodiments, facilitating formation of a business relationship between suppliers who express an interest and the at least one buyer includes managing a collaborative exchange of information between the buyer and the at least one supplier, while maintaining the buyer anonymity for as long as the buyer desires. That is, the buyer can maintain a level of anonymity as far along in the collaborative information exchange as the buyer selects.

For other embodiments, facilitating formation of a business relationship between suppliers who express an interest and the at least one buyer includes interested suppliers electronically expressing interest in the buyer by submitting an introduction to a buyer's application, and the buyer at least one of electronically indicating no interest, electronically indicating a lack of present interest but indicating a chance of a future interest, or electronically indicating a present interest.

Company (Buyer and Supplier Profiles)

Figure 6:
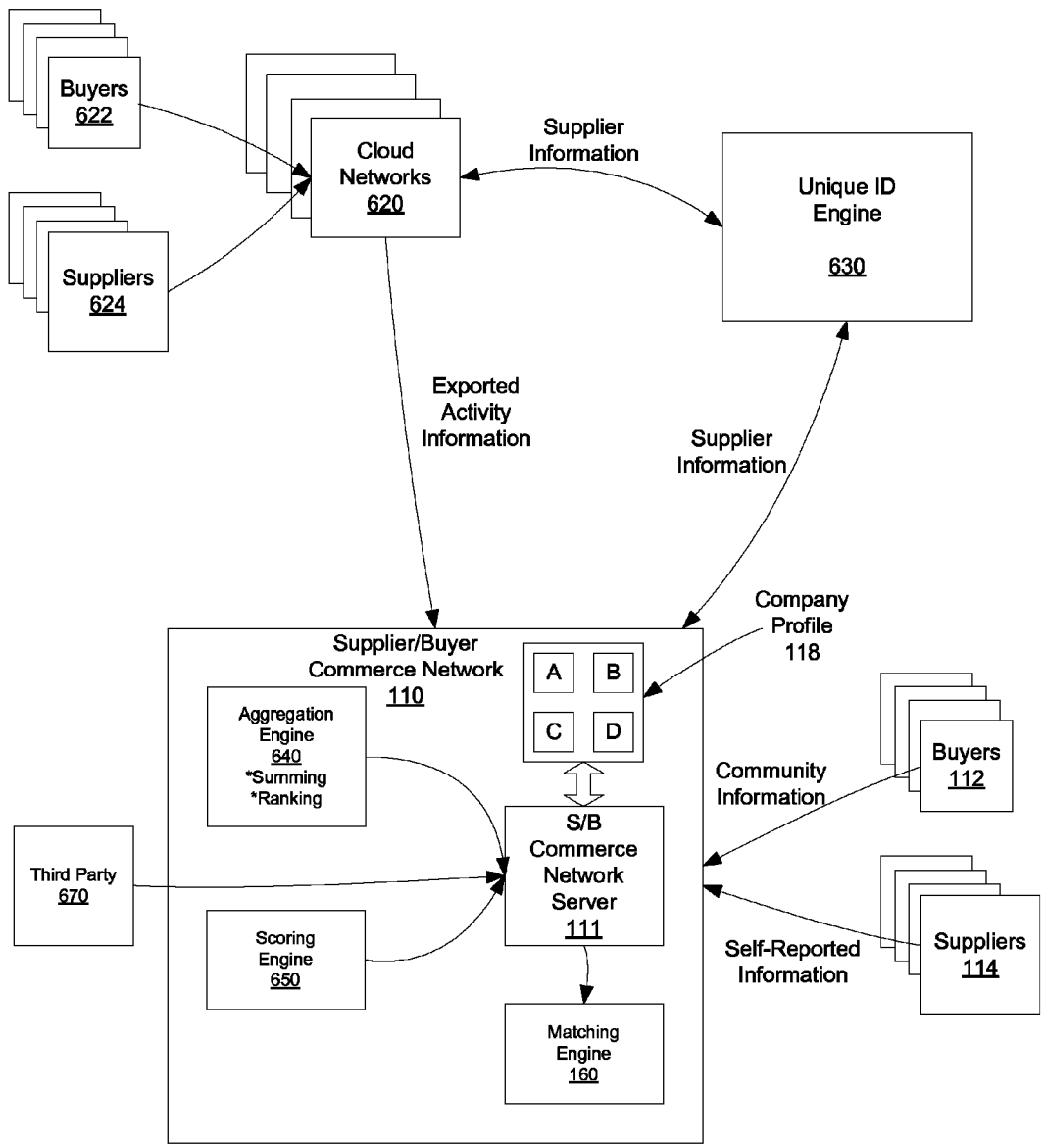
FIG. 6 shows an example of a system that facilitates a supplier/buyer commerce network maintaining a company profile, according to an embodiment.

FIG. 6 shows an example of a system that facilitates a supplier/buyer commerce network 110 maintaining a company profile 118, according to an embodiment. At least some embodiments include the company profile 118 being adaptively updated (by, for example, a commerce network server 111) as the company associated with the company profile 118 interacts with buyers 112, 622 and/or suppliers 114, 624. The company profile 118 can advantageously be used to generate a score for the company and/or match the company with other companies associated with the supplier/buyer commerce network 110. The company profile 118 is generally stored within a database associated with the supplier/buyer commerce network 110.

As shown, an embodiment of the company profile 118 includes four quadrants, wherein a first quadrant (A) includes self-reported information, a second quadrant (B) includes community information, a third quadrant (C) includes third party information, and fourth quadrant (D) includes aggregated activity information. It is to be understood that for some embodiments the company profile can include a subset of these quadrants, and for other embodiments, the company profile can include information in addition to the information of these four quadrants. The company profile 118 is a collection of information pertaining to the corresponding company that is associated with the network. The company profile allows other companies (suppliers 114 and/or buyers 112) to evaluate the company associated with the company profile 118. Clearly, the company profile can include fewer or more than the four quadrants.

The community information (quadrant B) includes information that pertains to the company that is provided by suppliers 114 and buyers 112 associated with the network. The community information includes, for example, ratings. The ratings allow, for example, a buyer to rate any supplier that has responded to a business opportunity on the supplier/buyer commerce network 110. For an embodiment, the supplier/buyer commerce network members are allowed to rate, for example, on five different components. For at least some embodiments, the rating is used for at least one of matching a buyer with a supplier, and evaluating quote received from a supplier.

A first example of a rating component includes an overall rating. The overall rating quantifies a buyer or suppliers overall rating of the company. It is not an average of the other ratings, but one that is assigned overall, all things considered.

A second example of a rating component includes communication. This rating criteria documents whether the company is responsive and thorough in questions and responses.

A third example of a rating component includes credibility. This rating component characterizes the trustworthiness, honesty and perceived reputation of the supplier.

A fourth example of a rating component includes reliability. This rating component assesses the companies' reliability, which represents the ability or perception that the supplier performs in a timely and accurate manner.

A fifth rating component includes quality. This rating component distinguishes the companies' understanding of needs and the ability to apply the understanding in a professional and valuable manner.

The ratings are generated by other users on the system. That is, for example, buyers leave ratings for suppliers, and suppliers leave ratings for buyers. Embodiments include using the five listed rating component, subsets of the five listed rating components, and/or additional rating components.

Another aspect of the community information includes references. For example, a supplier may request a buyer to leave a reference for the supplier. For embodiments, the supplier solicits the reference by supplying the email address of the buyer, or otherwise identifies the buyer. To further facilitate community and parallel real world interactions, embodiments of the supplier/buyer commerce network allows other buyers to request contact with the author of any given reference. For embodiments, the subject of the reference (the supplier) is the gatekeeper in such an interaction and may decline or accept the third party's request to speak with a reference. For embodiments, the reference itself contains a few pieces of information, for example, a text narrative, industry of the buyer, and/or length of the business relationship.

As previously described, the third party information (quadrant C) includes information that pertains to the company that is provided by a third party 170 who is typically not associated directly with the network.

The aggregated activity information includes, for example, transactional activity of the company. The aggregated activity information includes information about suppliers and their performance on the supplier/buyer commerce network 110.

A useful piece of aggregated activity information included within the company profile is the number of transacting relationships that the company has with buyers/suppliers 112, 114 on the supplier/buyer commerce network 110, and/or transacting relationships the company has with buyers/suppliers 122, 124 of other commerce networks, such as cloud networks 120. This information provides a valuable picture of how many other companies the company is actively doing business with via the supplier/buyer commerce network 110, and the cloud networks 120. It is to be understood that doing business with other companies includes activities can include interactions that do not include money, good or services changing hands. If the supplier/buyer commerce network 110 is interfaced with cloud networks 120, the company profile can be made to be common (the same) between commerce network platforms. Therefore, real-time information can be utilized across the commerce and cloud network platforms 110, 120.

Examples of aggregated activity information include, but are not limited to, event invitations, invitations by revenue, transaction awards (for example, winning supplier bids), revenue ranges, and/or top bids by industry.

The interface between the supplier/buyer commerce network 110 and cloud networks 620 allows the supplier/buyer commerce network 110 to glean additional information that can be useful for enhancing the value of the company profile 118. For example, cloud network 620 can include sourcing and/or contract information and data. These embodiments determine commonality of suppliers/buyers across multiple private cloud networks. The different companies (buyer/sellers) are assigned unique identifiers by, for example, a unique ID engine 630, which allows the generation of a single view of the companies' behavior across multiple interactions (across the supplier/buyer commerce network 110 and the cloud networks 620). That is, for embodiments, one or more databases are associated with networks 110, 620 that maintain transactional activity of the company with other companies, and this transaction information for the company is identified by the unique identifier of the company. The unique ID engine 630 can be operable, for example, on a server that is networked to the supplier/buyer commerce network 110.

Once the company has been assigned a unique identification by the unique ID engine 630, the supplier/buyer commerce network 110 imports (alternatively, the databases of the cloud networks 620 export) the activity information of the company from the databases of the cloud networks 620. While the unique ID engine 630 is shown as being separate from the supplier/buyer commerce network 110 in FIG. 6, it is to be understood that for other embodiments the unique ID engine 630 is included within the supplier/buyer network 110.

The activity information from the databases of the cloud networks 620 is aggregated by an aggregation engine 640. For embodiments, the aggregation includes summing or ranking the activity information. For embodiments, the aggregation engine 640 can be a computer or server that is a part of, or is connected to the supplier/buyer commerce network 110.

For at least some embodiments, the aggregated activity information) can be further processed by a scoring engine 650 that scores companies associated with the supplier/commerce network 110, and/or by the matching engine 160 that matches the company with buyers 112 or sellers 114 associated with the supplier/commerce network 110. For embodiments, the scoring engine 650 and the matching engine 160 can be computers or servers that are a part of, or are connected to the supplier/buyer commerce network 110.

The supplier/buyer commerce network 110, the cloud networks 620 and the unique ID engine 630 can each be implemented with one or more servers or computers (such as, a supplier/buyer commerce server, cloud network servers and a unique ID engine server). Additionally, the aggregation engine 640, the scoring engine 650 and the matching engine 160 can be each implemented with one or more servers, or they can all be implemented with a single server. Each of the supplier/buyer commerce network 110, the cloud networks 620 and the unique ID engine 630 can be interconnected through, for example, the internet or any other type of network. Additionally, the buyers 112, the sellers 114 and the third party 670 can be connected to the supplier/buyer commerce network 110 through, for example, the internet or any other type of network.

Figure 7:
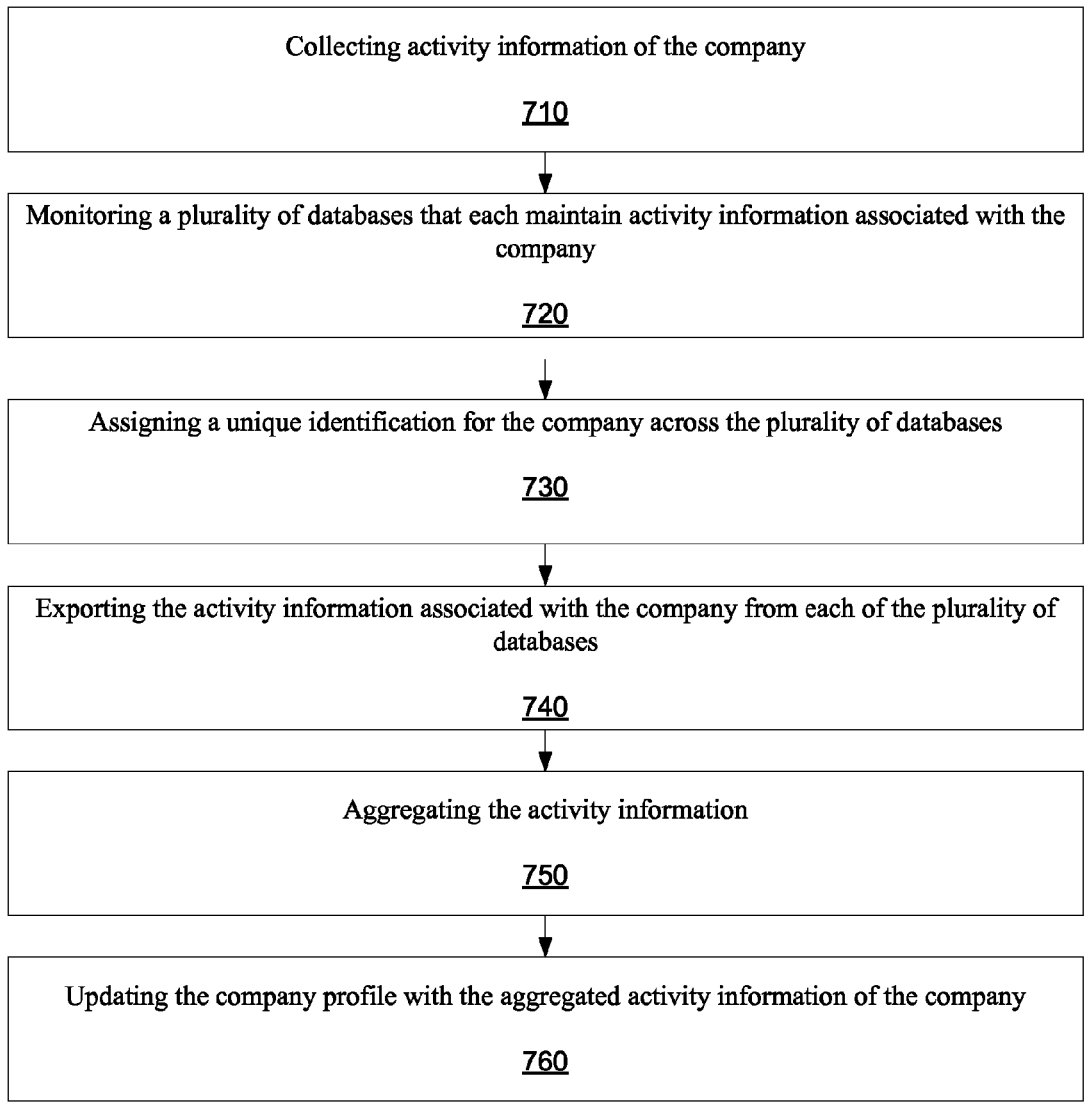
FIG. 7 is a flow chart that includes steps of an example of a method of maintaining a company profile of a company associated with a supplier/buyer commerce network, according to an embodiment.

FIG. 7 is a flow chart that includes steps of an example of a method of maintaining a company profile of a company associated with a supplier/buyer commerce network, according to an embodiment. A step 710 includes collecting activity information of the company, comprising. The collecting of activity information includes a step 720 that includes monitoring a plurality of databases that each maintain activity information associated with the company, a step 730 that includes assigning a unique identification for the company across the plurality of databases, a step 740 that includes exporting the activity information associated with the company from each of the plurality of databases, and a step 750 that includes aggregating the activity information. Finally, a step 760 includes updating the company profile with the aggregated activity information of the company. Embodiments include the supplier/buyer commerce network sharing the company profile with users of the supplier/buyer commerce network.

For an embodiment, the buyer information includes the buyer profile and the supplier information includes the supplier profile. Further, maintaining the buyer profile or the supplier profile of a company includes collecting activity information of the company. For an embodiment, collecting the activity information of the company includes monitoring a plurality of databases that each maintain activity information associated with the company, wherein the activity information includes transacting relationships that the company has with buyers or suppliers, assigning a unique identification for the company across the plurality of databases, exporting the activity information associated with the company from each of the plurality of databases based on the unique identification, aggregating the activity information exported from the plurality of databases, and updating the company (buyer or seller) profile with the aggregated activity information of the company.

Figure 8:
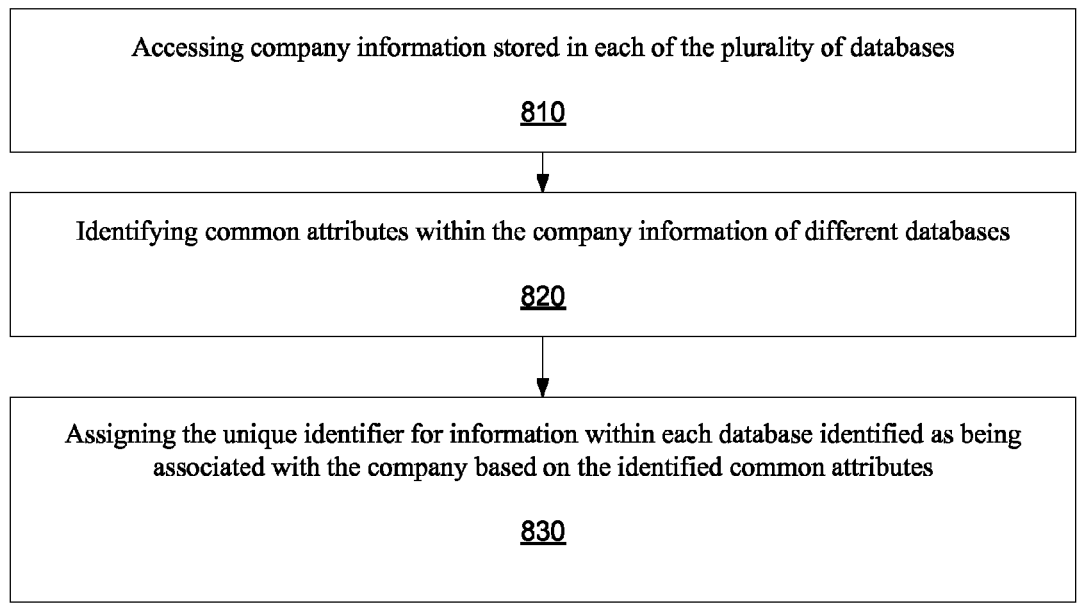
FIG. 8 is a flow chart that includes steps of an example of a method of assigning a unique identifier for the company, according to an embodiment.

FIG. 8 is a flow chart that includes steps of an example of a method of assigning a unique identifier for the company, according to an embodiment. A first step 810 includes accessing company information stored in each of the plurality of databases. A second step 820 includes identifying common attributes within the company information of different databases. A third step 830 includes assigning the unique identifier for information within each database identified as being associated with the company based on the identified common attributes.

For an embodiment, aggregating the current activity information includes summing the activity information of the company. Another embodiment of aggregating the activity information includes a ranking of multiple companies.

Figure 9:
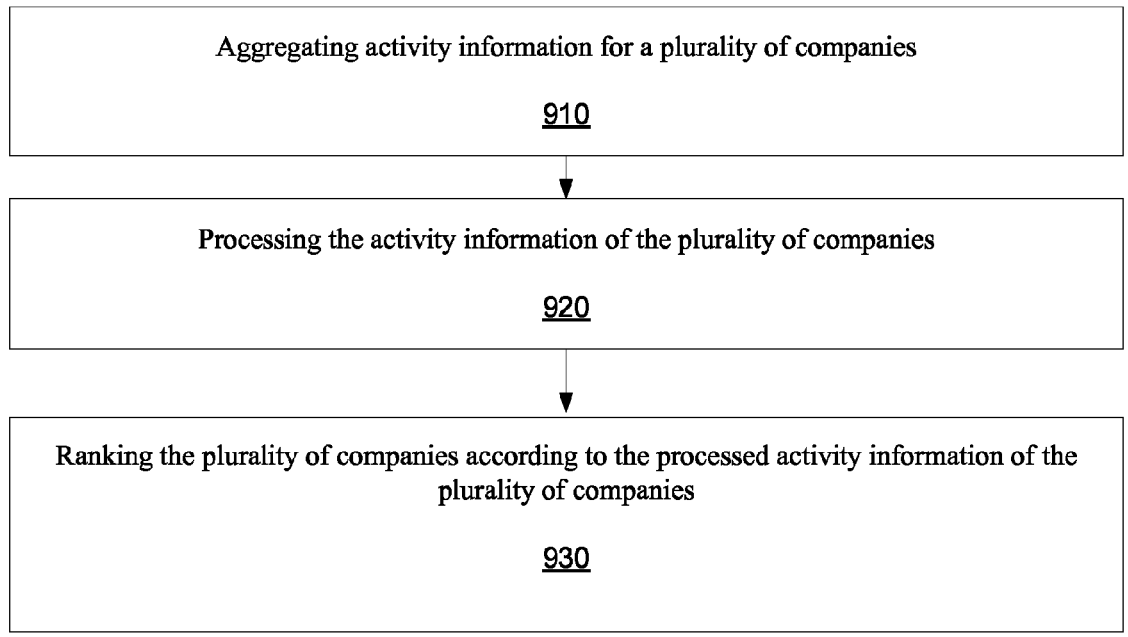
FIG. 9 is a flow chart that includes steps of an example of a method aggregating the activity information, according to an embodiment.

FIG. 9 is a flow chart that includes steps of an example of a method aggregating the activity information, according to an embodiment. A first step 910 includes aggregating activity information for a plurality of companies. A second step 920 includes processing the activity information of the plurality of companies. For embodiments, the processing of the activity information includes aggregating total transaction amounts or ranking the supplier based on competitiveness of their bids. A third step 930 includes ranking the plurality of companies according to the processed activity information of the plurality of companies.

For an embodiment, each of the plurality of companies is ranked by numbers of invitations to interact received by each of the plurality of companies. For another embodiment, each of the plurality of companies is ranked by numbers of completed interactions of each of the plurality of companies. For another embodiment, each of the plurality of companies is ranked by a size of interactions of each of the plurality of companies.

As previously described, an embodiment of the company profile includes community information. The community information includes information that pertains to the company that is provided by buyers and/or suppliers associated with the supplier/buyer commerce network, wherein the received information is related to the company. The supplier/buyer commerce network additionally incorporates the community information into the company profile.

Embodiments of the supplier/buyer commerce network generate a score for the company based on the aggregated activity information and at least one of the community information, self-reported information and third party information. The score provides other companies (buyers/suppliers) with an indicator who to work with and who to avoid or look at with more scrutiny. A numeric score can be mathematically determined a to enable users (buyer or supplier companies) to judge one supplier against another using a single metric. The score is only possible, useful and meaningful when combining many, many facets of information. Therefore the usefulness of the score is dependent upon the ability to gather data from the quadrants (A, B, C, D) effectively, and from there to create this derivative score. As previously described, for at least some embodiments, the score influences the matching of suppliers to the buyer. As previously described, for at least some embodiments, the score influences the evaluation and selection of quotes from suppliers.

Embodiments include generating an overall score for a company. This score is a derivative of all the information about the company that is available. Calculating the score includes taking into account whether a supplier has information available in each of the quadrants. The score is additionally dependent on how much information is available. A unique formula can be used to calculate the score based on the available company information. For embodiments, the score is not just a formula of information available, but also assigns value to the presence or absence of information. As previously described, for at least some embodiments, the score influences the matching of suppliers to the buyer. As previously described, for at least some embodiments, the score influences the evaluation and selection of quotes from suppliers.

For embodiments, the score formulae changes over time, especially as new information facets (data sources connected to the supplier/buyer commerce network) become available. The formulae may be dynamic in some cases, such that if a supplier does not have information type X available, the formula might then look for a similar type of information or use a slightly different formula to calculate the value. In essence, a score or indicator can be provided based on available information. The scores can be dynamic in that they may be presented relative to others in the same category or industry. That is, a curve could provide some sort of segmentation.

For an embodiment, the score is adaptively dependent upon each of the aggregated activity information, the community information, self-reported information and third party information depending on how much information is included within each of the aggregated activity information, the community information, self-reported information and third party information.

For an embodiment, the score is based on adaptive weighting of the aggregated activity information, the community information, self-reported information and third party information, wherein the weighting is dependent upon characteristics of one or more industries that the company is associated with.

Figure 10:
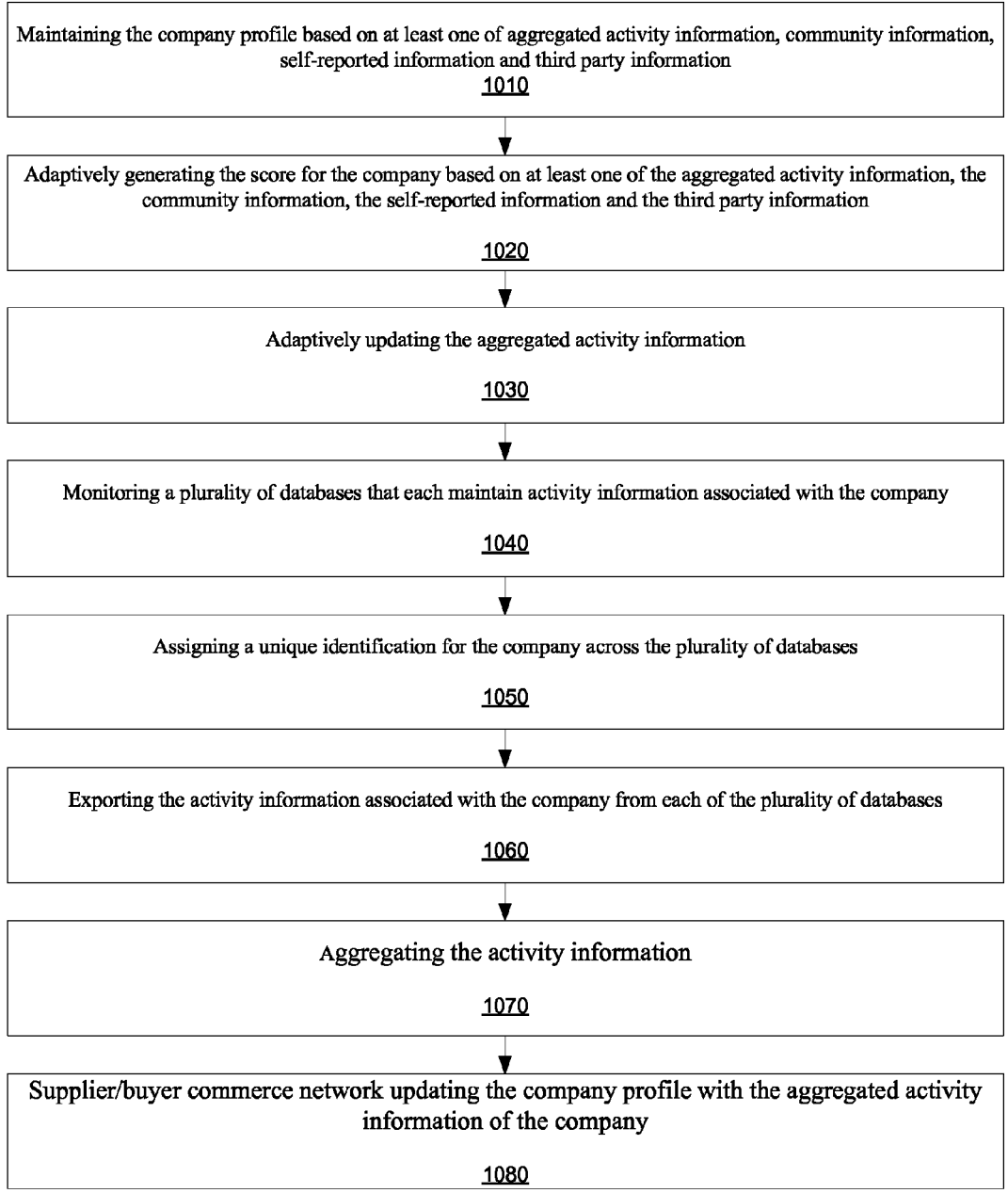
FIG. 10 is a flow chart that includes steps of an example of a method of scoring a company based on a company profile of a supplier/buyer commerce network, according to an embodiment.

FIG. 10 is a flow chart that includes steps of an example of a method of scoring a company based on a company profile of a supplier/buyer commerce network, according to an embodiment. This embodiment provides for scoring of a company associated with the supplier/buyer commerce network when the company has just joined the supplier/buyer commerce network and the supplier/buyer commerce network does not have much if any information about the company. A step 1010 includes maintaining the company profile based on at least one of aggregated activity information, community information, self-reported information and third party information. If the company has just joined the supplier/buyer commerce network, this can include some introductory self-reported information.

As time goes on, and the company interacts with buyers and/or suppliers of the supplier/buyer commerce network, the score is adaptively updated. A step 1020 includes adaptively generating the score for the company based on at least one of the aggregated activity information, the community information, the self-reported information and the third party information. A step 1030 includes adaptively updating the aggregated activity information, including a step 1040 that includes monitoring a plurality of databases that each maintain activity information associated with the company, a step 1050 that includes assigning a unique identification for the company across the plurality of databases, a step 1060 that includes exporting the activity information associated with the company from each of the plurality of databases, and a step 1070 that includes aggregating the activity information. A step 1080 includes the supplier/buyer commerce network updating the company profile with the aggregated activity information of the company.

Figure 11:
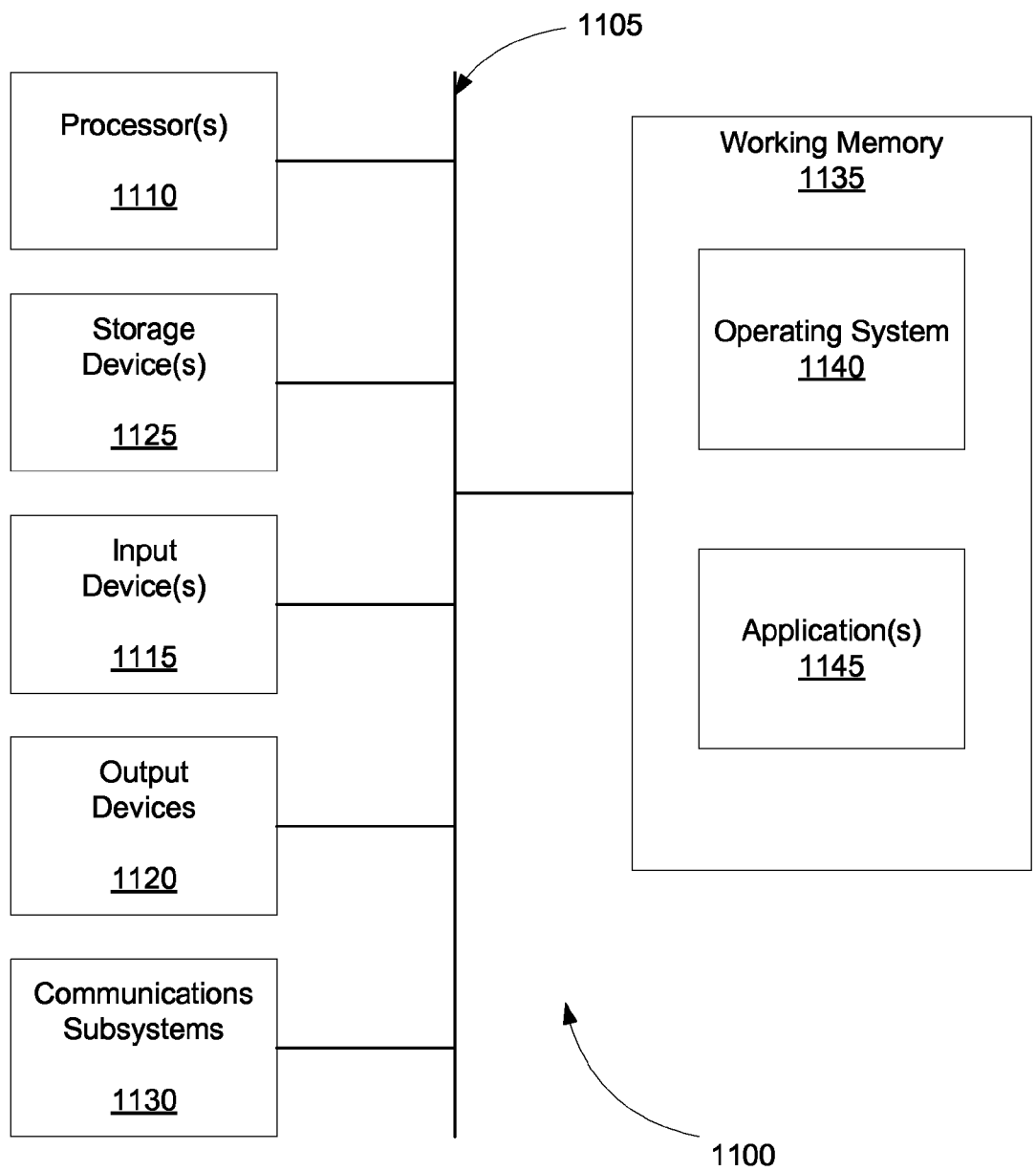
FIG. 11 shows a schematic illustration of one embodiment of a computer system that can perform the methods of the described embodiment, and/or can function as, for example, a supplier/buyer network that facilitates evaluation and selection of quotes of a commerce network.

FIG. 11 shows a schematic illustration of one embodiment of a computer system that can perform the methods of the described embodiment, and/or can function as, for example, a supplier/buyer network that facilitates evaluation and selection of quotes of a commerce network. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. The computer system 1100 is shown comprising hardware elements that can be electrically coupled via a bus 1105 (or may otherwise be in communication, as appropriate). The hardware elements can include one or more processors 1110, communication subsystems 1130, one or more input devices 1115, which can include without limitation a mouse, a keyboard and/or the like; and one or more output devices 1120, which can include without limitation a display device, a printer and/or the like. The computer system 1100 may further include (and/or be in communication with) one or more storage devices 1125. The computer system 1100 also can comprise software elements, shown as being located within the working memory 1135, including an operating system 1140 and/or other code, such as one or more application programs 1145, which may comprise computer programs of the described embodiments, and/or may be designed to implement methods of the described embodiments and/or configure systems of the embodiments as described herein.

Another embodiment includes a program storage device readable by a machine (of the supplier/buyer commerce network), tangibly embodying a non-transitory program of instructions executable by the machine to perform computer-method of electronically completing a commercial transaction. The method includes receiving, by one or more commerce network servers, a buyer-initiated demand for fulfillment of the commercial transaction, identifying suppliers to satisfy the buyer-initiated demand based on buyer policies and supplier characteristics, requesting quotes from the identified suppliers, receiving quotes from the identified suppliers, evaluating and selecting, by the one or more commerce network servers, one or more of the received quotes, wherein evaluating and selecting the one or more of the received quote comprises applying evaluating criteria to the received quotes, wherein the evaluation criteria includes applying a weighted combination of a plurality of evaluating factors, and facilitating presentation of the one or more selected quotes to the buyer.

N-Responses Policy

At least some embodiments include a bid policy (received responses to quotes) that includes at least N suppliers submitting proposals, and the buyer receiving N bids. The number of bids is adaptable, one embodiment including a minimum number of bids being received by the buyer, wherein the minimum number of bids is selectable by the buyer.

For an embodiment, the invitations to provide quotes are sent to at least a minimum number of suppliers, and at least the minimum number N of suppliers must submit proposals in response to the invitations to provide quotes. For at least some embodiments, the minimum number of bids N is dependent upon a requisition amount, a purchasing unit, a company code, and/or a commodity code (common commodity code, a partitioned commodity code).

An embodiment includes a hard stop wherein N quotes must be received. That is, if N quotes are not received, the collaboration is halted. Another embodiment includes a soft stop, wherein collaboration can continue in some form even if N proposals are not received.

For embodiments, the minimum number of required quotes is selected by the buyer, or more specifically, a buyer policy. For an embodiment, a policy table maintains the buyer selected minimum number of required proposals.

For embodiments, the value of N is adaptively selected by the buyer. For an embodiment, N is minimum number of proposals required for collaboration, and N is accessed from a policy look up table of the buyer. Attributes of the policy table can be configured by the buyer including the value of N. Additionally, the policy table includes data related to fields of a buyer policy, terms of the buyer policy.

Although specific embodiments have been described and illustrated, the embodiments are not to be limited to the specific forms or arrangements of parts so described and illustrated.

What is claimed is:

1. A computer-method of electronically completing a commercial transaction, comprising:
receiving, by one or more commerce network servers, a buyer-initiated demand for fulfillment of the commercial transaction from a buyer;
identifying buyer information, by the one or more commerce network servers, wherein the buyer information includes at least one of a buyer need or a buyer profile, wherein the buyer indicates at least one of a commodity or service, wherein the buyer profile includes at least self-reported information, and wherein the buyer information includes the buyer profile;
maintaining the buyer profile of a company, comprising:
collecting activity information of the company, wherein collecting the activity information of the company includes:
monitoring a plurality of databases across multiple networks that each maintain activity information associated with the company, wherein the activity information includes transacting relationships that the company has with buyers or suppliers;
assigning a unique identification for the company across the plurality of databases;
exporting the activity information associated with the company from each of the plurality of databases across the multiple networks based on the unique identification;
aggregating the activity information exported from the plurality of databases across the multiple networks;
updating the buyer profile with the aggregated activity information of the company; and
generating a single view of the activity information based on the unique identification for the company;
identifying suppliers to satisfy the buyer-initiated demand based on buyer policies and supplier characteristics;
requesting quotes from the identified suppliers;
receiving quotes from the identified suppliers;
evaluating and selecting, by the one or more commerce network servers, one or more of the received quotes, wherein evaluating and selecting the one or more of the received quote comprises applying evaluating criteria to the received quotes, wherein the evaluation criteria includes applying a weighted combination of a plurality of evaluating factors; and
facilitating presentation, via the single view, of the one or more selected quotes to the buyer.

2. The computer-method of claim 1, wherein applying the evaluating criteria to the received quotes comprises evaluating prior selections of received quotes and adaptively updating the weighted combination of the plurality of evaluating factors based on the evaluated prior selections.

3. The computer-method of claim 1, wherein the weighted combinations comprise greater weightings for evaluation criteria that are deduced to be of greater importance to the buyer based on prior actions of the buyer, and lesser weightings for evaluation criteria that are deduced to be of lesser importance to the buyer based on the prior actions of the buyer.

4. The method of claim 1, wherein the evaluating criteria comprises at least two of a price criteria, a quality of service (QoS) criteria, and a delivery time criteria.

5. The method of claim 1, wherein weighting of the weighted combination is adaptively selected based on monitoring and tracking of behavior of the buyer during prior transactions.

6. The method of claim 5, wherein the evaluation becomes more automated over time as behavior of the buyer is analyzed and behavior of the buyer is learned.

7. The computer-method of claim 1, wherein the buyer-initiated demand comprises at least one of an item or service for purchase, a place of delivery, a delivery date, a quantity, and expected price.

8. The computer-method of claim 1, wherein the buyer policies and supplier characteristics include at least one of approved suppliers, location of supplier, certification of supplier, prior performance of supplier, price of supplier.

9. The computer-method of claim 1, wherein requesting quotes from the identified suppliers, comprising electronically requesting the identified suppliers to provide a quote.

10. The computer-method of claim 1, wherein identifying suppliers to satisfy the buyer-initiated demand comprises matching the suppliers with business rules of the buyer.

11. The computer-method of claim 1, wherein identifying suppliers to satisfy the buyer-initiated demand further includes:
identifying supplier information, by the one or more commerce network servers, wherein the supplier information includes at least one of a supplier profile and tracked supplier behavior, wherein the supplier profile includes at least self-reported information and wherein the tracked supplier behavior includes at least interest shown or responses of a supplier to previously identified instances of buyer information; and
identifying suppliers to satisfy the buyer-initiated demand, by the one or more commerce network servers, comprising matching the buyer information with the supplier information.

12. The computer-method of claim 11, wherein the supplier information includes the supplier profile, and further comprising maintaining the supplier profile of a company, comprising:
collecting activity information of the company, wherein collecting the activity information of the company comprises:
monitoring a plurality of databases that each maintain activity information associated with the company, wherein the activity information includes transacting relationships that the company has with buyers or suppliers;
assigning a unique identification for the company across the plurality of databases;
exporting the activity information associated with the company from each of the plurality of databases based on the unique identification;
aggregating the activity information exported from the plurality of databases; and
updating the supplier profile with the aggregated activity information of the company.

13. The computer-method of claim 1, wherein identifying suppliers to satisfy the buyer-initiated demand comprises:
applying at least a portion of the evaluation criteria of received quotes to identify suppliers.

14. A commerce network system, comprising:
one or more commerce network servers operative to:
receive, a buyer-initiated demand for fulfillment of a commercial transaction from a buyer;
identify buyer information, wherein the buyer information includes at least one of a buyer need or a buyer profile, wherein the buyer indicates at least one of a commodity or service, wherein the buyer profile includes at least self-reported information, and wherein the buyer information includes the buyer profile;
maintain the buyer profile of a company, comprising:
collect activity information of the company, wherein collecting the activity information of the company includes:
monitoring a plurality of databases across multiple networks that each maintain activity information associated with the company, wherein the activity information includes transacting relationships that the company has with buyers or suppliers;
assigning a unique identification for the company across the plurality of databases;
exporting the activity information associated with the company from each of the plurality of databases across the multiple networks based on the unique identification;
aggregating the activity information exported from the plurality of databases;
updating the buyer profile with the aggregated activity information of the company; and
generating a single view of the activity information based on the unique identification for the company;
identify suppliers to satisfy the buyer-initiated demand based on buyer policies and supplier characteristics;
request quotes from the identified suppliers;
receive quotes from the identified suppliers;
evaluate and select one or more of the received quotes, wherein evaluating and selecting the one or more of the received quote comprises applying evaluating criteria to the received quotes, wherein the evaluation criteria includes applying a weighted combination of a plurality of evaluating factors; and
facilitate presentation, via the single view, of the one or more selected quotes to the buyer.

15. The commerce network system of claim 14, wherein applying the evaluating criteria to the received quotes comprises evaluating prior selections of received quotes and adaptively updating the weighted combination of the plurality of evaluating factors based on the evaluated prior selections.

16. The commerce network system of claim 14, wherein the weighted combinations comprise greater weightings for evaluation criteria that are deduced to be of greater importance to the buyer based on prior actions of the buyer, a lesser weightings for evaluation criteria that are deduced to be of lesser importance to the buyer based on the prior actions of the buyer.

17. The commerce network system of claim 14, wherein the evaluating criteria comprises at least two of a price criteria, a quality of service (QoS) criteria, a delivery time criteria.

18. The commerce network system of claim 14, wherein weighting of the weighted combination is adaptively selected based on monitoring and tracking of behavior of the buyer during prior transactions.

19. The commerce network system of claim 18, wherein the evaluation becomes more automated over time as behavior of the buyer is analyzed and behavior of the buyer is learned.

20. The commerce network system of claim 14, wherein the buyer-initiated demand comprises at least one of an item or service for purchase, a place of delivery, a delivery date, a quantity, and expected price.

21. The commerce network system of claim 14, wherein the buyer policies and supplier characteristics include at least one of approved suppliers, location of supplier, certification of supplier, prior performance of supplier, price of supplier.

22. The commerce network system of claim 14, wherein requesting quotes from the identified suppliers, comprising electronically requesting the identified suppliers to provide a quote.

23. The commerce network system of claim 14, wherein identifying suppliers to satisfy the buyer-initiated demand comprises matching the suppliers with business rules of the buyer.

24. The commerce network system of claim 14, wherein identifying suppliers to satisfy the buyer-initiated demand further includes:

identifying supplier information, by the one or more commerce network servers, wherein the supplier information includes at least one of a supplier profile and tracked supplier behavior, wherein the supplier profile includes at least self-reported information and wherein the tracked supplier behavior includes at least interest shown or responses of a supplier to previously identified instances of buyer information; and identifying suppliers to satisfy the buyer-initiated demand, by the one or more commerce network servers, comprising matching the buyer information with the supplier information.

25. The commerce network system of claim 24, the supplier information includes the supplier profile, and further comprising maintaining the supplier profile of a company, comprising:

collecting activity information of the company, wherein collecting the activity information of the company comprises:

monitoring a plurality of databases that each maintain activity information associated with the company, wherein the activity information includes transacting relationships that the company has with buyers or suppliers;

assigning a unique identification for the company across the plurality of databases;

exporting the activity information associated with the company from each of the plurality of databases based on the unique identification;

aggregating the activity information exported from the plurality of databases; and updating the supplier profile with the aggregated activity information of the company.

26. The commerce network system of claim 14, wherein identifying suppliers to satisfy the buyer-initiated demand comprises:

applying at least a portion of the evaluation criteria of received quotes to identify suppliers.

* * * * *